United States Patent [19]
Minuhin et al.

[11] Patent Number: 5,459,757
[45] Date of Patent: Oct. 17, 1995

[54] TIMING AND GAIN CONTROL CIRCUIT FOR A PRML READ CHANNEL

[75] Inventors: Vadim B. Minuhin; Vladimir Kovner; Steven V. Holsinger, all of Oklahoma City; Srinivasan Surendran, Norman, all of Okla.

[73] Assignee: Seagate Technology, Inc., Scotts Valley, Calif.

[21] Appl. No.: 309,761

[22] Filed: Sep. 21, 1994

[51] Int. Cl.⁶ .............................. H04L 7/00; H04L 27/08; H04L 25/34; H03D 3/24
[52] U.S. Cl. ........................ 375/376; 375/345; 375/290
[58] Field of Search .................. 375/355, 354, 375/345, 290, 286, 371, 376; 327/141, 144, 155, 162, 179, 50, 72, 91, 95; 328/63, 72; 360/70, 67, 32, 46

[56] References Cited

U.S. PATENT DOCUMENTS

| | | | |
|---|---|---|---|
| 4,692,931 | 9/1987 | Ohsawa | 375/355 |
| 4,780,889 | 10/1988 | Ley et al. | 375/355 |
| 4,890,299 | 12/1989 | Dolivo et al. | 375/290 |
| 5,258,933 | 11/1993 | Johnson et al. | 375/290 |
| 5,297,184 | 3/1994 | Behrens et al. | 375/345 |
| 5,311,178 | 5/1994 | Pan et al. | 360/46 |
| 5,375,145 | 12/1994 | Abbott et al. | 375/345 |

OTHER PUBLICATIONS

Kurt H. Mueller and Markus Muller; "Timing Recovery in Digital Synchronous Data Receivers"; May 1976; pp. 516–531; from *IEEE Transactions on Communications*, vol. COM-24, No. 5.

"A PRML System for Digital Magnetic Recording" by Roy D. Cideciyan, Francois Dolivo, Reto Hermann, Walter Hirt and Wolfgang Schott; pp. 38–56; Jan., 1992.

*Primary Examiner*—Stephen Chin
*Assistant Examiner*—Tesfalaet Bocure
*Attorney, Agent, or Firm*—Bill D. McCarthy; Louis W. Watson; Edward P. Heller, III

[57] ABSTRACT

Method and apparatus for controlling the timing of the sampling of signals and signal amplitude in a PRML read channel. A VCO generates a read clock and a clock generator connected to the VCO generates even and odd clock signals corresponding to even and odd cycles of operation of the VCO. Serially connected even sample and hold circuits respond to clock signals to store samples of the read channel signal taken during successive odd cycles and serially connected odd sample and hold circuits store samples taken during successive even cycles. Comparator circuits compare the samples taken in each cycle to reference signals and the comparisons are clocked through two stage, even and odd shift registers to provide estimates of the presence or absence of nonzero samples for each even and odd cycle. Even and odd time error generators connected to the sample and hold circuits and, via AND gates enabled during even and odd cycles respectively, to the shift registers, generate even and odd time error signals from the samples and estimates during even and odd cycles respectively. An adder transmits the even and odd time error signals to the VCO input. Even and odd gain error generators connected to the sample and hold circuits and the AND gates generate even and odd gain error signals transmitted to a variable gain amplifier in the read channel.

4 Claims, 11 Drawing Sheets

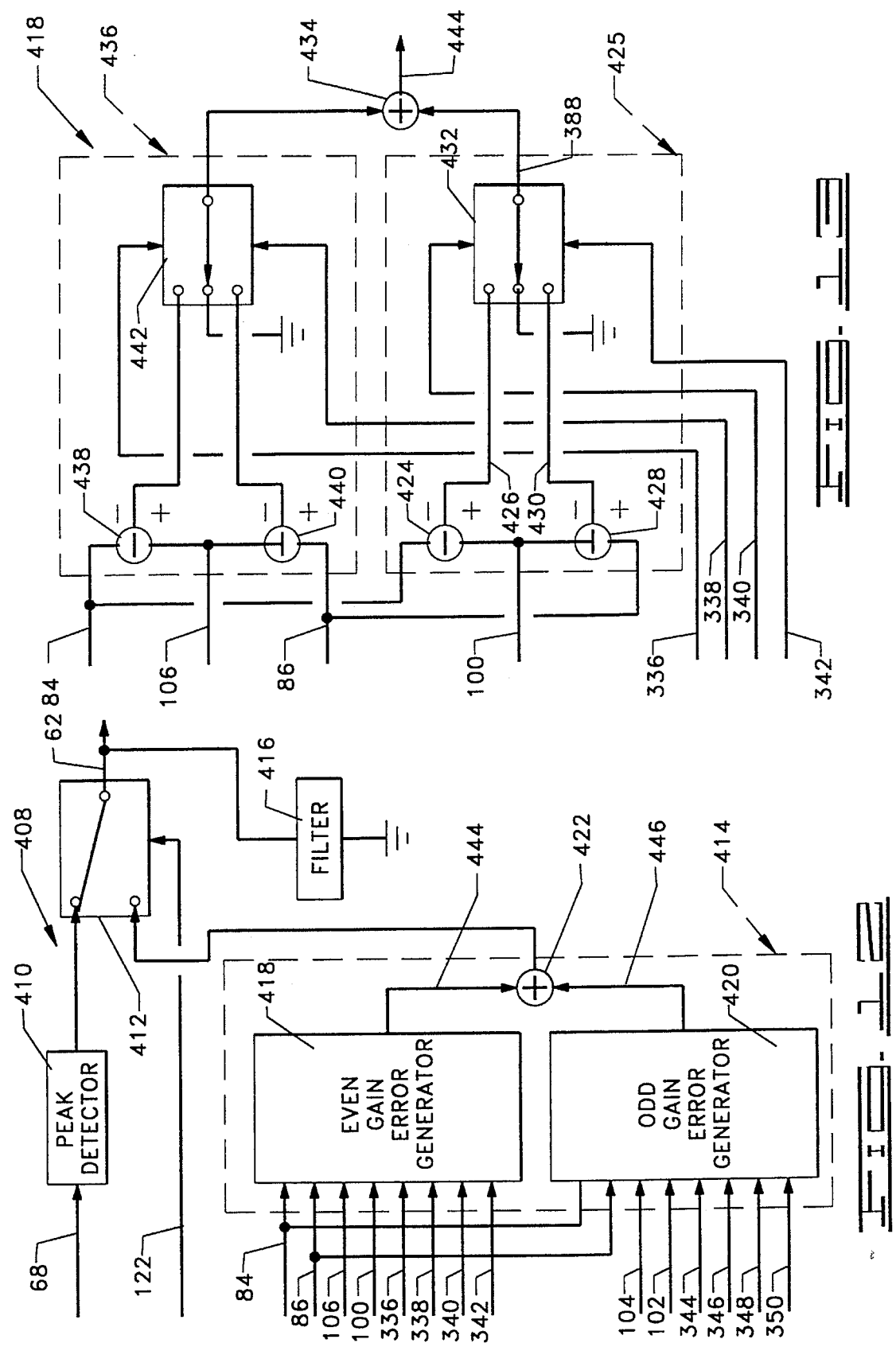

100
TIMING AND GAIN CONTROL CIRCUIT FOR A PRML READ CHANNEL

BACKGROUND OF THE INVENTION

1. Field of the Invention

The present invention relates generally to improvements in apparatus and methods for retrieval of stored data from a disc drive data track, and more particularly, but not by way of limitation, to improvements in timing and gain control in the retrieval of data in disc drives having a PRML read channel.

2. Brief Description of the Prior Art

In a disc drive, user files are stored along concentric data tracks defined in magnetizable surface coatings on the surfaces of rotating discs. To this end, during storage of a file, user data is encoded and bits of the encoded file are serially clocked to a write head driver that passes an electrical current through a write head adjacent a selected disc surface to magnetize segments of a selected data track in a pattern that reflects the sequence of logical values of bits that comprise the encoded file. These magnetized segments, in turn, produce a magnetic field that can be sensed by a read head during reading to generate a sequence of electrical pulses that reflects the pattern of magnetization of the data track to permit recovery of the encoded file for decoding and return to a computer which makes use of the disc drive.

Conventionally, the electrical pulses induced in the read head, each corresponding to a flux transition along the data track; that is, a reversal in the direction of magnetization of the surface coating, have been peak detected within "read windows" that are generated by a read clock and the read clock also provides clock signals that are employed in transferring logic values, corresponding to the presence or absence of peaks in the read windows, to downstream components which regenerate the user file and make the file available to the computer. Synchronization between the generation of pulses in the read head and generation of clock signals by the read clock, necessary to transfer each logic value to downstream components as it is produced, has been effected using a Phase Locked Loop (PLL) for the read clock and transmitting pulse edges generated in the peak detector to the phase locked loop while data is being read from a data track. Thus, the read clock has been continually readjusted to track the electrical pulses induced in the read head by passage of flux transitions along a data track by the read head.

The synchronization between the generation of logic values from pulses induced in the read head and the generation of clock pulses used to transfer the logic values into downstream components in a conventional disc drive permits the use of high transfer rates in the writing and subsequent reading of data to, in turn, provide a large file storage capacity for the disc drive and much work has been done to maximize the data storage capacity of such disc drives via increases in the transfer rate. However, several effects tend to limit transfer rate. The synchronization depends upon a correspondence between peaks in the signal induced in the read head and passage of individual flux transitions by the read head. However, the magnetic field from which the read head signal is derived is a superposition of the magnetic fields produced by all of the flux transitions on the disc. Consequently, as the transfer rate is increased to decrease the spacing of flux transitions along a data track, so-called "intersymbol interference"; that is, significant superposition of magnetic fields from successive flux transitions on a data track, causes peaks in the read head to be shifted in time from the times that such peaks would occur for an isolated flux transition. While the effects of intersymbol interference can be minimized; for example, by pulse slimming and prewrite compensation, it cannot be eliminated. As a result, as transfer rates have been increased, peak shifting has become an increasingly difficult problem that has tended to limit transfer rates in conventional disc drives.

A second effect that gives rise to a limitation in the transfer rate in disc drives employing a peak detect read channel is electronic noise in the read channel. As the transfer rate is increased, it becomes increasingly difficult to filter high frequency noise that can cause errors in the retrieval of a file from the signals induced in the read head. Consequently, while high data transfer rates have been achieved in disc drives employing peak detection to recover stored data, it has become increasingly difficult to achieve further increases in the transfer rate and, in turn, the data storage capacity, of such drives.

Because of this difficulty in increasing the data transfer rate in disc drives employing peak detection in the read channel, increasing interest has arisen in recent years in disc drives having so-called PRML read channels. In disc drives of this type, partial response signalling is utilized to control, rather than to suppress, intersymbol interference and the effect of noise is minimized by the use of maximum likelihood estimation of the magnetization of sequences of segments of the data track. To this end, signals corresponding to individual flux transitions are filtered to a signal which, in the absence of noise, would have a nominal form, for which the intersymbol interference is known and can be controlled, and the signals are then sampled for maximum likelihood detection in which each bit of encoded data is recovered in the context of the sequence of bits that were written to the disc to limit the effect of noise. Since the intersymbol interference can be taken into account in the regeneration of the data and since the data is recovered in relation to sequences of bits, disc drives utilizing PRML read channels have a potential for achieving transfer rates that will greatly exceed transfer rates that can be achieved in disc drives that employ peak detection of signals induced in the read head.

In practice, problems have arisen with the use of PRML read channels that limit transfer rates that can be achieved. Since samples of the filtered signal are used to determine the sequence of data bits written to a data track, the samples must be taken at specific times determined by the nominal form to which the signals in the channel are, ideally, filtered and the amplitudes of the signals must be carefully controlled if intersymbol interference is to be appropriately compensated and maximum likelihood detection is to yield the sequence of data bits that were written to the disc. More specifically, differences between actual sample times and sample times dictated by the nominal signal wave form and channel gain variations act as noise which can interfere with the ensuing maximum likelihood detection of the signals. Thus, an important aspect of the use of a PRML read channel in a disc drive is control of the timing of clock signals used to sample signals in the read channel and to operate the maximum likelihood detectors that recover the sequence of stored data bits and control of the amplitude of read channel signals.

The general approach that has been taken to sampling time and signal amplitude control in disc drives having PRML read channels is based on theory that has been presented in the paper: K. H. Mueller and M. Muller, "Timing Recovery in Digital Synchronous Data Receivers", IEEE Transactions on Communications, Vol. COM-24, pp 516–530, May 1976. Applying this theory to a partial response type 4 channel (PR-4) in which the present invention is used, a time error signal is generated at each sampling interval k in accordance with the equation:

$$\text{time error } (k) = x(k) \, y(k-1) - x(k-1) \, y(k), \tag{1}$$

where x(k) is the estimate of the presence or absence of a legitimate nonzero sample and its polarity at the kth sampling moment, y(k) is the actual sample value for the kth moment and x(k–1) and y(k–1) are similarly defined for the previous sampling moment. Estimates are practically obtained by the comparison of the sample with a threshold set to one half the amplitude of the nominal signal to which signals in the channel are ideally filtered; that is:

$$\text{Threshold} = \pm A/, \tag{2}$$

where A is the amplitude of the nominal signal. For the purpose of the present invention, the estimates have only three possible values: −1, 0, and +1.

The time error signal so determined is then used to adjust the frequency and phase of a voltage controlled oscillator that generates clock signals used to time the sampling and the operation of the maximum likelihood detection circuitry.

Similarly, a gain error, used to adjust the gain of a variable gain amplifier in the read channel to control the amplitude of the filtered signal, can be developed in accordance with the relation:

$$\text{gain error } (k) = \{y(k) - A \text{ sign } [x(k)]\} \, x(k) + \{y \, (k-1) - A \text{ sign } [x(k-1)]\} \, x(k-1). \tag{3}$$

While the underlying theory of time and gain control in a PRML disc drive is thus well known, practical problems in the application of the theory have limited the degree to which such control can be maintained with increasing transfer rates so that the promise of higher transfer rates that underlies the development of PRML read channels has been largely unrealized. As in the case of peak detection circuitry, characteristics of components utilized to realize a timing circuit in a disc drive having a PRML read channel are limited by economics to, in turn, limit the extent to which sampling times and signal amplitudes of the signals can be controlled. While this problem can, to some extent, be overcome by digitizing the samples and utilizing digital circuitry, a digital filter and digital signal processing to implement the above expressions, the use of digital signal processing introduces new problems. The digital signal processing requires at least several additional clock cycles. This, introduces additional processing time in the timing circuitry that is unrelated to the sample time indicated by the theory with the result that time and gain corrections are delayed with respect to the times at which the samples are taken. Such delay is usually termed a "transportation lag" or a "dead time" in control theory. See, for example, K. Ogada, "Modern Control Engineering", Prentice-Hall, Englewood Cliff, N.J., 1970, pp 346–350. The dead time adversely affects PLL performance and can easily cause instability of the loop.

SUMMARY OF THE INVENTION

The present invention provides a timing and gain control circuit that has a negligible transportation lag and, further, places lower demands upon components of which the circuit is constructed than is the case for timing and gain control circuits that make use of digital circuitry. To this end, the timing and gain control circuit of the present invention is comprised of a timing circuit that includes a voltage controlled oscillator whose phase and frequency are adjusted in relation to even and odd error signals that are generated in alternate cycles of operation of the VCO. More particularly, the VCO generates a read clock which is transmitted to a clock generator that produces even and odd series of clock signals that are used to operate even and odd components of the timing circuit during even and odd read clock cycles so that the timing and gain control circuit is, in effect, operated at half the data transfer rate. Since the only component of the timing circuit that is operated at the transfer rate is the VCO, which is adaptively adjusted by the time error signal, the transfer rate of the read channel can be increased without the use of signal digitization or the use of precision components in the manufacture of the timing circuit.

More particularly, the timing circuit is comprised of most recent even and odd sample and hold circuits which are used to sample signals induced in the read channel during odd and even read clock cycles respectively so that, during each even cycle of operation of the VCO, the most recent even sample and hold circuit will contain a most recent even sample taken during the preceding odd cycle of operation of the VCO and, during each odd cycle, the most recent odd sample and hold circuit will contain a most recent odd sample taken during a preceding even cycle of operation of the VCO. The outputs of the most recent even and odd sample and hold circuits are received by previous even and odd sample and hold circuits which enter the contents of the most recent even and odd sample and hold circuits in response to clock signals that are provided by the clock generator during even and odd cycles of operation of the VCO respectively. Thus, during each even cycle of operation of the VCO, the most recent even sample and hold circuit will contain the most recently taken even sample of the signal in the read channel and the previous odd sample and hold circuit will contain a sample taken in the preceding even cycle of operation of the VCO. Similarly, during each odd cycle of operation of the VCO, the most recent odd sample and hold circuit will contain the most recently taken odd sample of the signal in the read channel and the previous even sample and hold circuit will contain a sample taken in the preceding odd cycle of operation of the VCO.

The timing circuit is further comprised of even and odd comparators which are connected to the most recent even and odd sample and hold circuits respectively and to a voltage reference generator to generate the estimates x(k) in the above relations for even and odd cycles of operation of the VCO respectively. The even and odd comparators are connected to two stage even and odd shift registers respectively and the shift registers are clocked by signals received from the clock generator to enter the most recently generated even estimate into the first stage of the even shift register at the beginning of each even cycle of operation of the VCO while entering the odd estimate generated in the preceding even cycle into the second stage of the odd shift register. Similarly, the most recently generated odd estimate is entered into the first stage of the odd shift register at the beginning of each odd cycle of operation of the VCO while the even estimate generated in the preceding odd cycle of operation of the VCO is entered into the second stage of the even shift register. Consequently, during each cycle of operation of the VCO, one of the sample and hold circuits will contain the sample taken during the preceding cycle of operation of the VCO, one sample and hold circuit will contain the sample taken during the next preceding cycle, one stage of one shift register will contain the estimate generated during the preceding cycle of operation of the VCO and one stage of the other shift register will contain the estimate generated during the next preceding cycle of operation of the VCO.

The timing circuit is further comprised of even and odd time error generators that are connected to the sample and hold circuits and, via AND gates that are enabled during even and odd cycles respectively, to the shift registers. Consequently, during each even cycle of operation of the VCO, the even time error generator receives the most recently taken even sample, the odd sample taken in the preceding even cycle, the most recently generated even estimate, and the odd estimate generated in the preceding even cycle. Similarly, during each odd cycle of operation of the VCO, the odd time error generator receives the most recently taken odd sample, the even sample taken in the preceding odd cycle, the most recently generated odd estimate, and the even estimate generated in the preceding odd cycle. Thus, during each even cycle of operation of the VCO, the even time error generator receives signals that express the quantities in equation (1) while, during each odd cycle, the odd time error generator receives signals that express the quantities in equation (1). The even and odd time error generators operate in accordance with equation (1) to produce even and odd time error signals during even and odd cycles of operation of the VCO respectively while, in the absence of estimates during odd and even cycles respectively, produce zero outputs during odd and even cycles of operation of the VCO respectively. The outputs of the even and odd time error generators are added and transmitted to the input of the VCO to provide an error signal, determined in accordance with equation (1), to the VCO in each cycle of operation of the VCO. Thus, the VCO can be adjusted during each cycle of operation of the VCO at the data transfer rate but the timing circuitry need be constructed to operated reliably at only one half the data transfer rate.

Gain control is similarly achieved by even and odd gain error generation circuits that receive the samples, the estimates and reference voltages to generate even and odd gain error signals in accordance with equation (3) above. The even and odd gain error signals are then transmitted to a variable gain amplifier in the read channel during even and odd cycles of operation of the VCO to effect amplitude control of the signals induced in the channel by passage of the read head by flux transitions along a data track.

It will thus be seen that the VCO is adjusted with a maximum delay of only a part of a sample period; that is, the time between the taking of an even (or odd) sample in an odd (or even) cycle and the use of that sample in the next even (or odd) cycle, without regard to data transfer rate. Thus, the time between the taking of a sample and its use in the generation of time and gain errors is automatically compensated for increases in the data transfer rate. Further, since the sample and hold circuits, the shift registers and error generators operate on an even and odd basis; that is, at half the read clock frequency, control of timing and channel gain can be effected at substantially higher channel transfer rates than might otherwise be achieved using electronic components of which these circuit components are comprised.

An important object of the present invention is to increase data transfer rates at which disc drives having PRML read channels can be operated.

Another object of the invention is to improve the control of the timing of sampling of signals in a PRML read channel and the control of the amplitude of such signals.

Yet a further object of the invention is to provide a disc drive having a PRML read channel with a timing and gain control circuit that exhibits minimum delay in the correction of the phase and frequency of clock signals utilized to sample and detect data retrieved from a data track of the disc drive.

Other objects, features and advantages of the present invention will become apparent from the following detailed description when read in conjunction with the drawings and appended claims.

BRIEF DESCRIPTION OF THE DRAWINGS

FIG. 11 is a circuit diagram of the time error generator of FIG. 3.

FIG. 12 is a block diagram of the gain control circuit of the timing and gain control circuit of FIG. 1.

FIG. 13 is a circuit diagram of the even gain error generator of FIG. 13.

DESCRIPTION OF THE RECORDING CHANNEL

Figure 1:
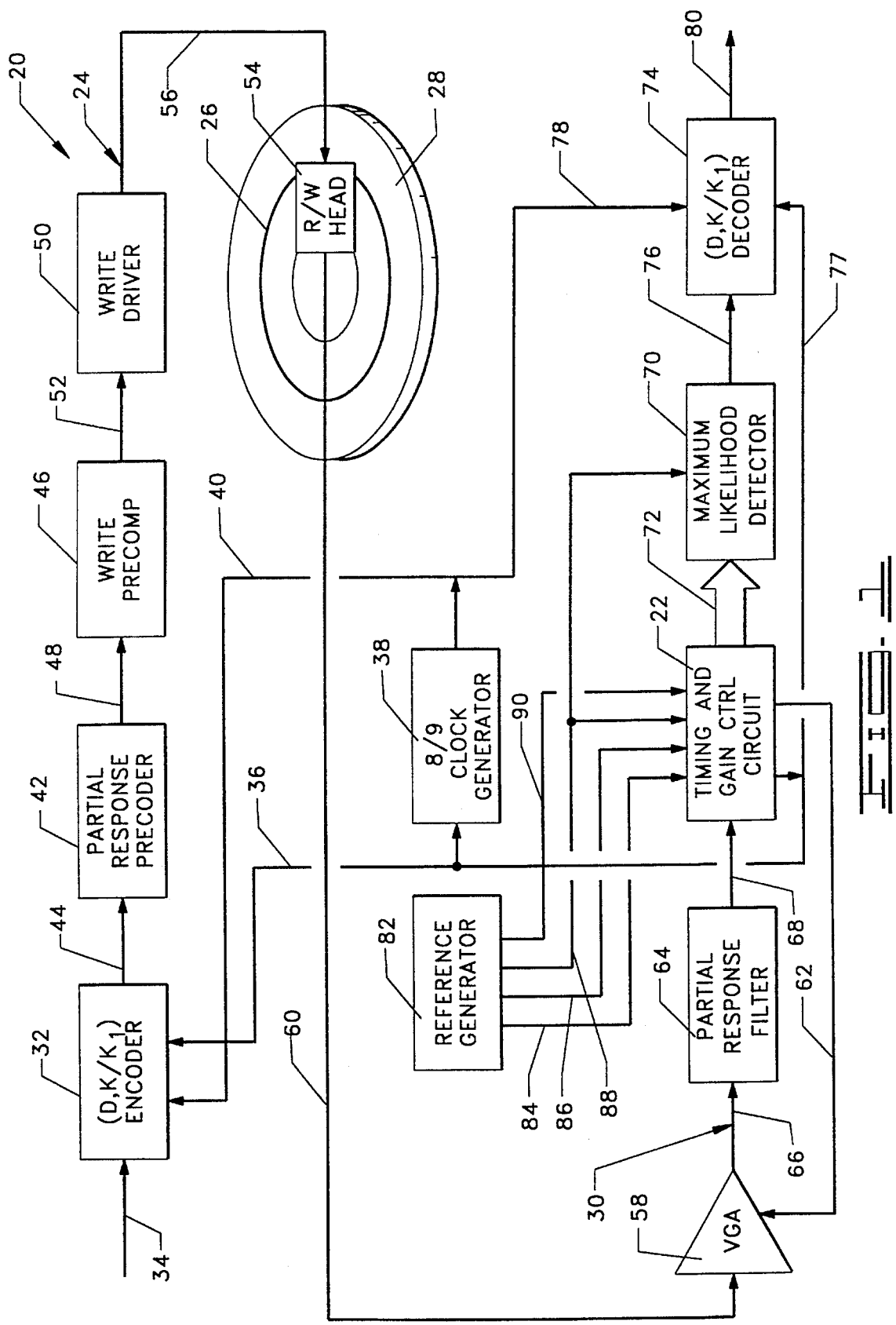
FIG. 1 is a block diagram of a PRML recording channel including the timing and gain control circuit of the present invention.

Referring now to the drawings in general and to FIG. 1 in particular, shown therein and designated by the general reference number 20 is a block diagram of a PRML recording channel for a disc drive that includes a timing and gain control circuit 22 constructed in accordance with the present invention. In general, the recording channel 20 is comprised of a write channel, generally indicated at 24 in FIG. 1, which is operated in a write mode of the recording channel to store computer programs and user files along data tracks, such as the data track 26, on a rotating disc 28, and a read channel, generally indicated at 30, that retrieves stored files in a read mode of operation of the recording channel 20. To facilitate an understanding of the present invention, it will be useful to briefly summarize the construction and operation of the write and read channels, 24 and 30 respectively, before proceeding to the construction and operation of the timing and gain control circuit 22.

As is conventional, the write channel 24 is comprised of an encoder 32 that receives data bits of a user file on a signal path 34 during the storage of the file and encodes the user data in response to timing signals received from the timing circuit 22 on a signal path 36 and an 8/9 clock generator 38, that receives the clock signals on the path 36 and generates a clock at 8/9 the frequency of the clock that provides the timing signals on the path 36, on a signal path 40. The encoder 32 provides 9 bits of encoded data for each 8 bits of user data to a partial response precoder 42, on a signal path 44, that precodes the encoded data in a manner that is determined by the class of partial response signaling that has been selected for use in the recording channel 20. The present invention contemplates that such selected class of partial response signaling will be class IV signaling that has been described by Kabal et al. in "Partial Response Signaling", IEEE Transactions on Communications, Vol. Com-23, No. 9, pp 921–934, September 1975, pertinent features of which will be described below with respect to FIG. 2. In a disc drive that utilizes class IV partial response signaling, the precoder generates a sequence of bits $\{b_n\}$ from the sequence of encoded bits $\{a_n\}$ of the encoded user data in accordance with the relation:

$$a_n = b_n \text{ XOR } b_{n-1}. \tag{4}$$

The encoded and precoded data is transmitted to a write precompensation circuit 46, via a signal path 48, that selectively delays the transmission of bits of the data and thence to a write driver 50, via a signal path 52, that passes a current through a read/write head 54, via a signal path 56, in a direction determined by the logic value presently at the input of the write driver 50. The read/write head 54 is positioned adjacent a surface of the disc 28 and such surface is provided with a magnetizable surface coating so that currents passed through the read/write head 54 will magnetize segments of a data track 26 with which the read/write head is radially aligned to effect storage of data along the data track. Thus, successive segments of a data track are magnetized in a pattern that reflects the encoded data bits through the relationship expressed by equation (4) above. The encoder 32, the partial response precoder 42, write precompensation circuit 46, write driver 50, and read/write head 54 are conventional and operate conventionally during the storage of a user files so that they not be further described herein.

In a read mode of operation of the recording channel 20, passage of a magnetic flux transition along a data track 26 with which the read/write head 54 is aligned induces an electrical signal in the head 54 and such signal is transmitted to a variable gain amplifier 58, via a signal path 60, that adjusts the amplitude of the signal in response to a gain error signal received from the timing and gain control circuit 22, on a signal path 62, in a manner and for a purpose to be described below. Signals induced in the read channel by passage of flux transitions by the read/write head 54 are transmitted to a partial response filter 64 via a signal path 66 and thence, via a signal path 68, to the timing and gain control circuit 22. As will be discussed more fully below, the timing and gain control circuit 22 periodically samples the signal in the read channel 30 during the read mode of operation and such samples are transmitted to a maximum likelihood detector 70, via signal paths collectively indicated at 72, along with clock signals that are utilized in the operation of the maximum likelihood detector 70 to generate the most likely sequence of magnetization of segments of the data track and, from such sequence using equation (4) above, the most likely sequence of data bits that issued from the encoder 32 when the data along the data track was stored. This sequence is transmitted to a decoder 74 via a signal path 76 which decodes the received sequence to recover data bits of the stored user file in response to clock signals received from the timing and gain control circuit 22 on a signal path 77 and from the 8/9 clock generator 38 on a signal path 78. The recovered bits are then transmitted, via a signal path 80, to components of the disc drive with which the present invention is not concerned for return to a host computer with which the disc drive is used. The variable gain amplifier 58 and decoder 74 are conventional and need not be further discussed herein for purposes of the present disclosure. Preferred constructions for the partial response filter 64 and maximum likelihood detector 70 are described in U.S. patent application Ser. No. 08/309,912 entitled "FILTER SYSTEM FOR A PRML READ CHANNEL IN A DISC DRIVE", filed on Sep. 21, 1994 and U.S. patent application Ser. No. 08/309,870 entitled "IMPROVED MAXIMUM LIKELIHOOD DETECTOR FOR A DISC DRIVE PRML READ CHANNEL", filed on Sep. 21, 1994 respectively, both such applications having been filed on even date with the present application and the teaching of both such applications being hereby incorporated by reference.

As will be discussed more fully below, the timing and gain control circuit 22 makes use of selected reference voltages in the read mode of operation of the recording channel 20 and such reference voltages are provided by a conventional reference generator 82 via signal paths indicated at 84, 86, 88 and 90 in FIG. 1. These reference voltages are defined with reference to a nominal signal, shown in FIG. 2 to which attention is now invited, to which signals induced in the read head 54 by passage of a flux transition on a data track radially aligned with the read head would be filtered by the filter 64 in the absence of noise in the read channel 30 during the read mode of operation of the recording channel 20.

Figure 2:
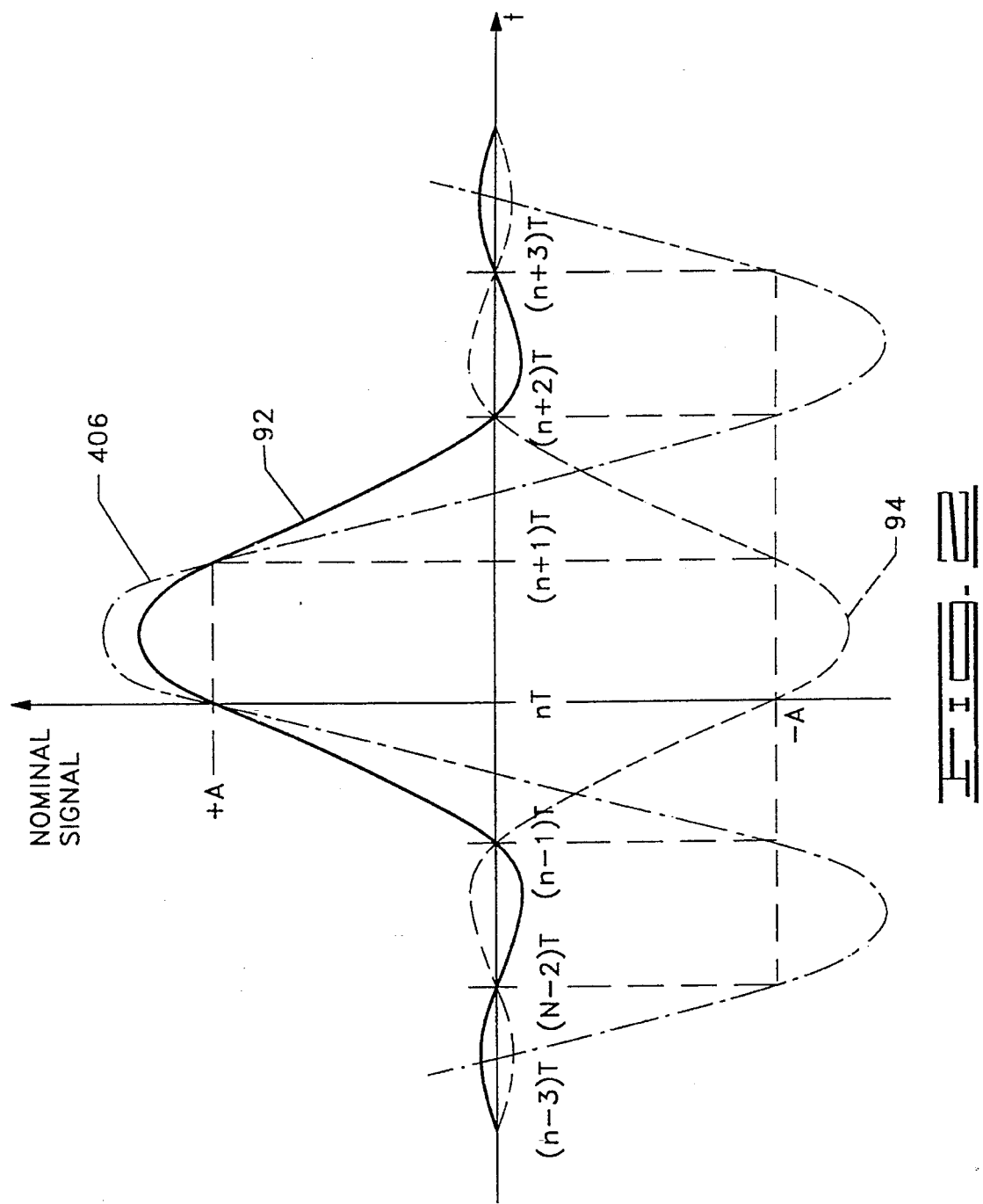
FIG. 2 is a PR-4 wave form to which signals generated in a read head would be ideally filtered in recording channel of FIG. 1.

Referring to FIG. 2, shown therein in solid line at 92 is a graph of the signal ideally issuing from the filter 64 in response to passage of the a flux transition, considered to be the nth flux transition and assumed to have a positive polarity, by the read/write head 54. (For a flux transition having a negative polarity, the ideal signal would have the form shown in dashed line at 94.) The purpose of the timing and gain control circuit of the present invention is, in part, to generate samples of the actual signal issuing from the filter at nominal sample times which are referred to the nominal signal shown in FIG. 2; specifically, at the times which are shown as integral multiples of the time T which is equal to the reciprocal of the transfer rate of data to and from a selected data track on the surface of disc 28. Thus, in one aspect of the invention, the timing and gain control circuit 22 generates clock signals which are synchronized with sample times that are defined with respect to the form of the nominal signal shown in FIG. 2. In a second aspect of the invention, the timing and gain control circuit 22, in combination with the variable gain amplifier 58, adjusts the amplitude of the signal issuing from the filter 64 so that, in the absence of noise in the signal, the samples would have the magnitudes indicated for the sample times shown in FIG. 2 of +A, 0, or −A. With reference voltages of +A, −A, +A/2 and −A/2 supplied by the reference generator 82 on the signal paths 84, 86, 88 and 90 of FIG. 1 respectively, the timing and gain control circuit 22 generates clocks that are used to time the sampling of the filter 64 output and in the maximum likelihood detection of such samples and, further, generates gain error signals that are transmitted to the variable gain amplifier 58 to maintain the sample values, in the absence of noise, at the levels +A, 0 and −A.

DESCRIPTION OF THE TIMING CIRCUIT

Figure 3:
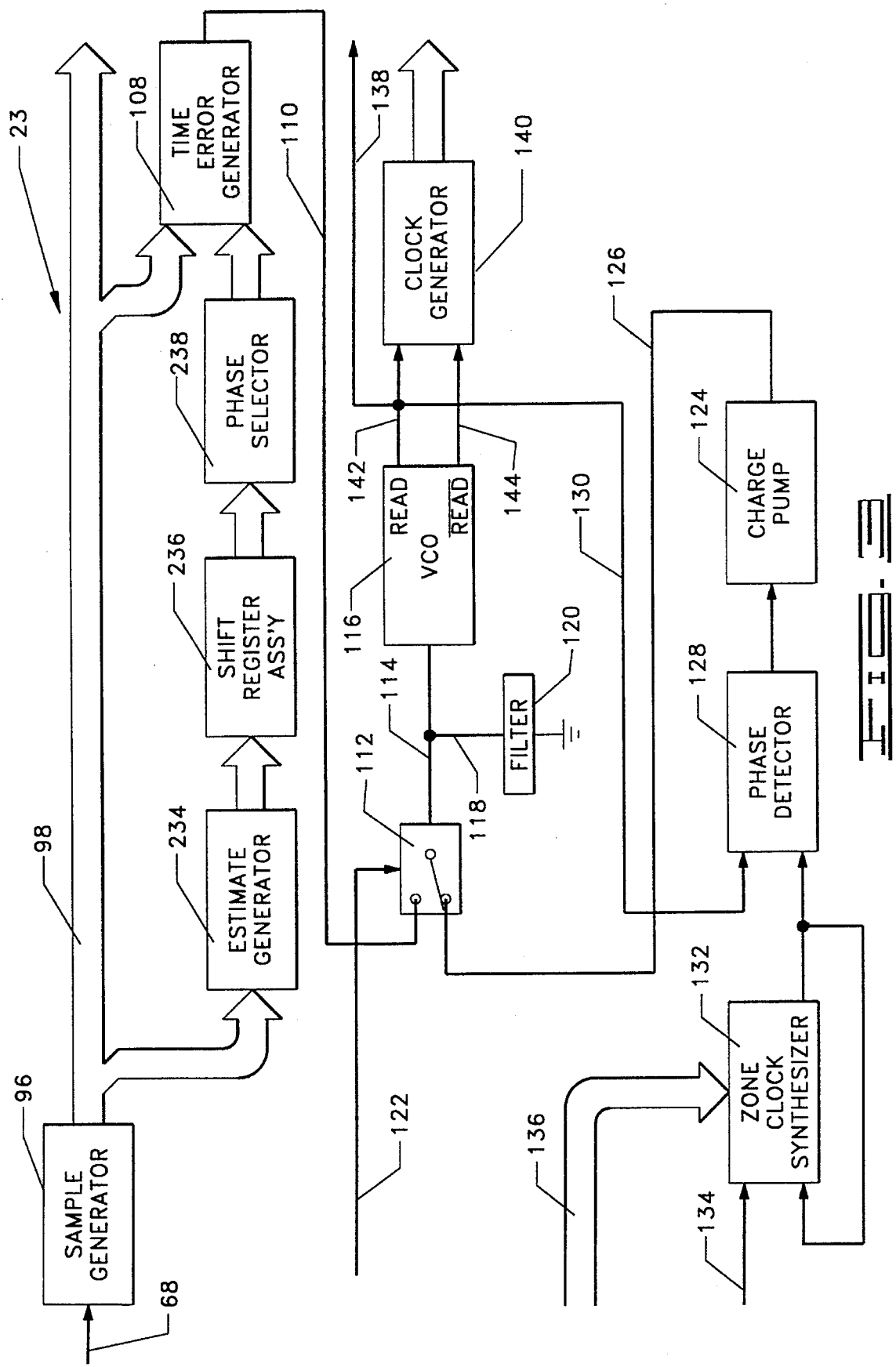
FIG. 3 is a block diagram of the timing circuit of the timing and gain control circuit of FIG. 1.

Referring now to FIG. 3, shown therein is a block diagram of a timing circuit 23 of the timing and gain control circuit 22, portions of which have been illustrated in more detail in FIGS. 4, 6, 8, 9, 11, 12, 13 and 14. In order to facilitate an understanding of the present invention and the manner in which it operates in relation to remaining portions of the recording channel 20 and the disc drive of which the recording channel is a part, signal paths that transmit signals employed in the operation of the timing and gain control circuit 22 have been numbered in the drawings and the numerical designations of the signal paths have been carried from each drawing to other drawings in which they appear.

As shown in FIG. 3, the timing circuit 23 is comprised of a sample generator 96 which receives the signal issuing from the partial response filter 64 on the signal path 68, samples the filter 64 output as will be discussed below, and outputs the samples on a plurality of signal paths that have been indicated as a bus 98 in FIG. 3, as signal paths 100, 102, 104 and 106 in FIG. 6 which illustrates the sample generator 96 in more detail, as signal paths 100 and 102 in FIG. 8, and as signal paths 100, 102, 104 and 106 in FIG. 11.

The timing circuit 23 is further comprised of a time error generator 108, shown in more detail in FIGS. 11 and 12, which receives the samples on the signal paths 100, 102, 104 and 106 (the bus 98 in FIG. 3) and generates a time error signal that is impressed on a signal path 110 leading to one input terminal of a single pole, double throw electronic switch 112, having a common terminal that connects, via a signal path 114, to the input of a read VCO 116 and, via the signal path 114 and a signal path 118, to one end of a filter 120. The other end of the filter 120, which can be comprised of a capacitor (not shown) in series with the parallel combination of a resistor (not shown) and capacitor (not shown) as is conventional in the art, is connected to a timing and gain control circuit ground so that changes in the voltage received at the input of the read VCO 116 will adjust both the frequency and phase of the read VCO in a conventional manner.

In a read mode of operation of the recording channel 20 in which data stored on a data track is retrieved., the switch 112 responds to a read gate signal provided on a signal path 122 from a conventional controller (not shown) to transmit the time error signal to the input of the read VCO so that the frequency and phase of a read clock, generated in two phases by the VCO 116, will be adjusted in relation to the time error signal. In the absence of the read gate signal, the switch 112 connects the input of the VCO to the output of a charge pump 124, via a signal path 126, which receives the output of a phase detector 128 having one input connected, via a signal path 130, to one phase of the clock generated by the VCO 116. The other input of the phase detector 128 is connected to the output of a zone clock synthesizer 132, constructed in the manner described in U.S. Pat. No. 4,799,112, issued Jan. 17, 1989 to Bremmer et al., that receives a reference signal on a signal path 134 from a servo clock with which disc drives are conventionally provided. As described in the aforementioned U.S. Pat. No. 4,799,112, the zone clock synthesizer generates a zone clock having a selectable frequency determined by a frequency control signal that can be provided from a system microprocessor (not shown) that is a standard component of a disc drive. Thus, at times other than the reading of data, the VCO 116, charge pump 124, phase detector 128, and filter 120 form a conventional phase locked loop that tracks a zone clock signal having a frequency that is selectable from the system microprocessor via a digital code expressed on a bus 136 from the microprocessor. One phase of the VCO 116 clock is connected to the encoder 32 and 8/9 clock generator 38, via a signal path 138 that has been carried into FIG. 1, so that the transfer rate of encoded and precoded data to a data track on the disc 28 can be selected in accordance with the principles presented in the aforementioned U.S. Pat. No. 4,799,112.

Both phases of the read clock generated by the VCO 116 are transmitted to a clock generator 140, via signal paths 142 and 144, which generates a plurality of clock signals that are used in the operation of the components of the read channel 30. A circuit diagram for the clock generator 140 has been presented in FIG. 4 and timing diagrams for the clock signals with respect to the read clock have been presented in FIG. 5.

Figure 4:
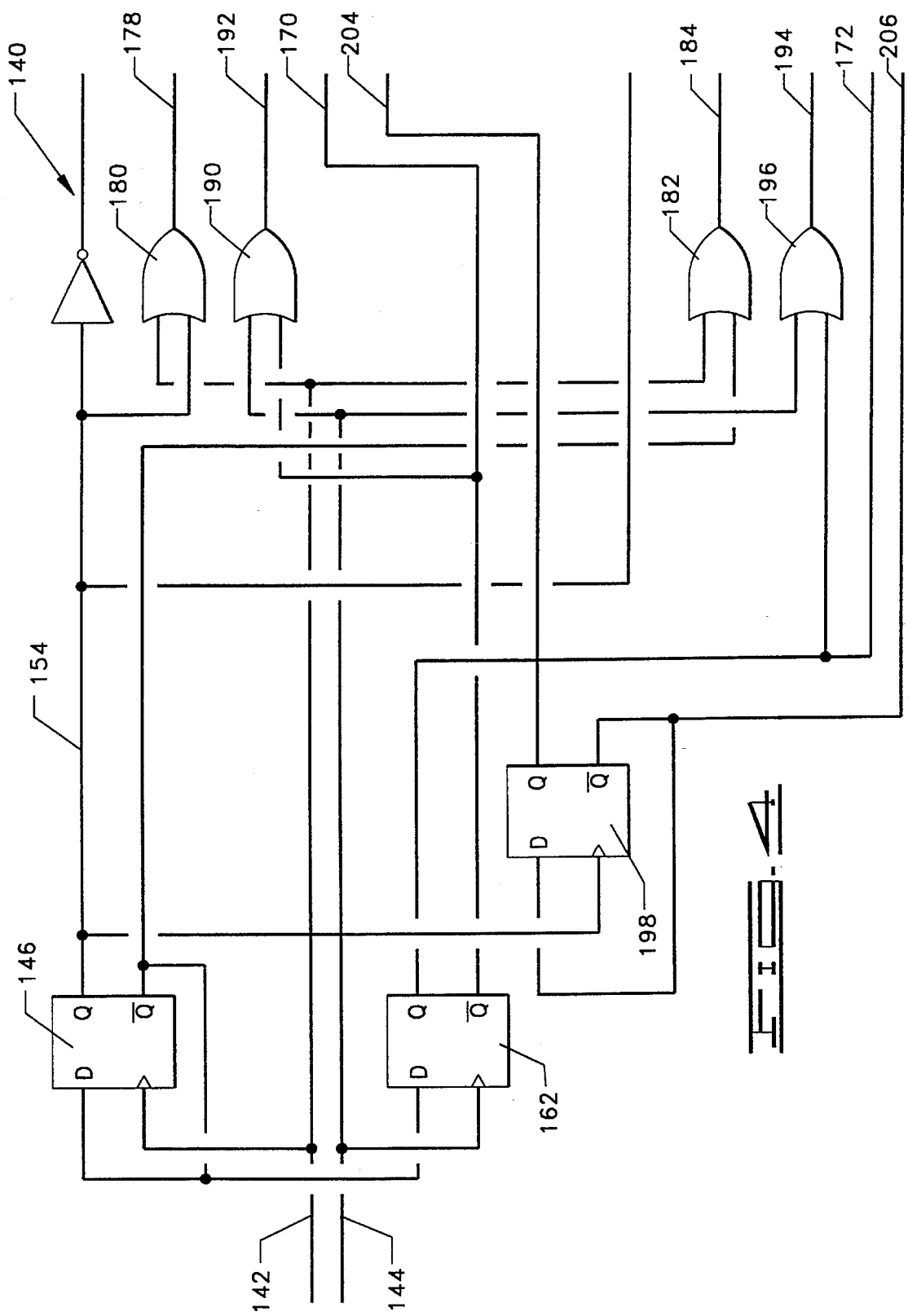
FIG. 4 is a block diagram of the clock generator of FIG. 3.
Figure 5:
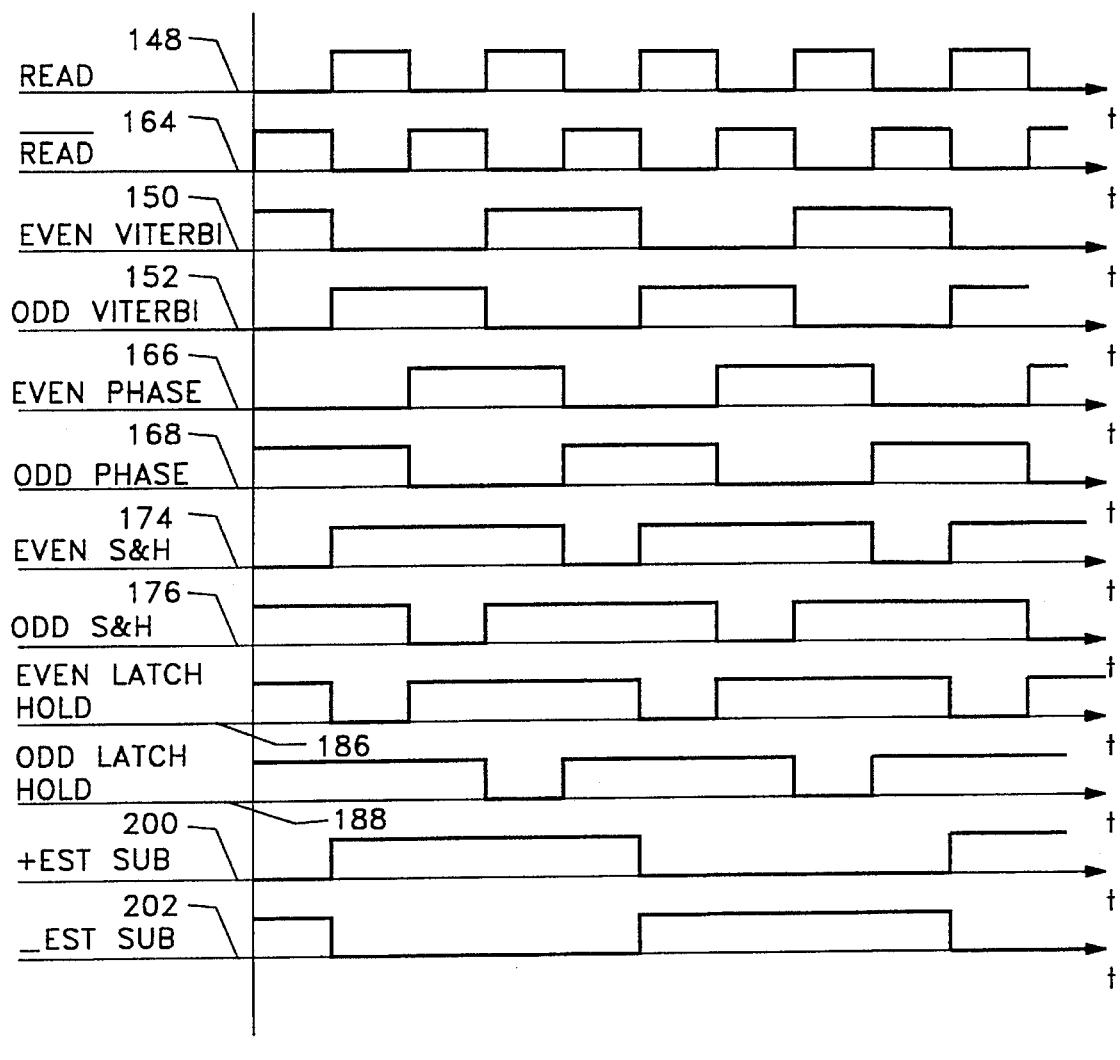
FIG. 5 is a timing diagram illustrating signals generated by the clock generator in relation to the read clock produced by the VCO of the timing circuit.

With reference to FIGS. 4 and 5, one phase of the read clock, indicated as READ on the line 148 of the timing diagram in FIG. 5, is transmitted to the clock input of a type D flip flop 146 and the $\bar{Q}$ output of the flip flop 146 is connected to the D input thereof so that the outputs of the flip flop 146 will change state at the beginning of each cycle of the read clock signal on the signal path 142. The Q output of the flip flop 146 provides EVEN VITERBI and ODD VITERBI clock signals, phased with respect to the read clock as shown at 150 and 152 in FIG. 5, that are used by the maximum likelihood detector 70 during the reading of data as described in the aforementioned PCT Application entitled "Improved Maximum Likelihood Detector for a Disc Drive PRML Channel" and need not be further considered herein.

The $\bar{Q}$ output of the flip flop 146 is further connected to the D input of a type D flip flop 162 that is clocked by the second phase, indicated as $\overline{READ}$ on line 164 in FIG. 5, of the read clock provided by the VCO 116 to generate EVEN PHASE and ODD PHASE clock signals, shown at 166 and 168 respectively in FIG. 5. More particularly, the Q output of the flip flop 162 provides the EVEN PHASE clock signal on a signal path 170 and the $\bar{Q}$ output of the flip flop 162 provides the ODD PHASE signal on a signal path 172, both of which have been carried into FIG. 9, for use in a manner that will be discussed below.

The outputs of the flip flop 146 are further used to generate an EVEN SAMPLE & HOLD clock signal that, as shown at 174 in FIG. 5, rises in the center of each ODD PHASE clock signal and an ODD SAMPLE & HOLD clock signal that, as shown at 176 in FIG. 5, rises in the center of each EVEN PHASE clock signal. Specifically, the EVEN SAMPLE & HOLD clock signal is produced on the signal path 178 of FIG. 4 at the output of an OR gate 180 that receives the READ clock signal on signal path 142 and the logical level expressed at the Q output of the flip flop 146 on a signal path 154. The $\bar{Q}$ output of the flip flop 146 is connected to one input of an OR gate 182, the other input of which receives the READ clock signal to generate the ODD SAMPLE & HOLD clock signal on a signal path 184 from the OR gate 182 output.

The outputs of the flip flop 162 similarly serve as the source of an EVEN LATCH HOLD clock signal and an ODD LATCH HOLD clock signal that have been illustrated on lines 186 and 188 of FIG. 5. To this end, the Q output of the flip flop 162 is transmitted to one input of an OR gate 190, the other input of which receives the second, or READ, phase of the read clock provided by the VCO 116 to provide the EVEN LATCH HOLD clock signal on a signal path 192 at the output of the OR gate 190. The ODD LATCH HOLD clock signal is provided on a signal path 194 from the output of an OR gate 196 whose inputs are connected to the Q output of the flip flop 162 and the signal path 144 that carries the READ phase of the read clock provided by the VCO 116. The pertinent feature of the latch hold clock signals, as shown in FIG. 5, is that they rise concurrently with the rise of the even and odd phase signals.

Referring once again to FIG. 4, the clock generator 140 is further comprised of a type D flip flop 198 that is clocked by signals at the Q output of the flip flop 146 and has interconnected Q and D terminals so that the outputs of the flip flop provide two phases of clock that operates at a frequency that is a fourth the frequency of the read clock. These two phases, a POSITIVE ESTIMATE SUBSTITUTE, shown at 200 in FIG. 5, and a NEGATIVE ESTIMATE SUBSTITUTE, shown at 202 in FIG. 5, are impressed on signal paths 204 and 206 respectively from the Q and $\bar{Q}$ outputs respectively of the flip flop 198. The pertinent feature of the positive and negative estimate substitutes is that each is high for alternating time periods in which a rise in the EVEN LATCH HOLD clock signal is followed by a rise in the ODD LATCH HOLD signal. (In keeping with the object of increasing disc drive transfer rate, the clock generator 140 may be implemented in current mode logic. However, potions of the maximum likelihood detector 70 are preferably implemented in CMOS logic to minimize power consumption by the read channel 30. Accordingly, the clock generator 140 may include current mode logic to CMOS logic conversion circuitry, not shown, for transforming the EVEN VITERBI and ODD VITERBI clock signals to a form suitable for clocking CMOS circuitry.)

Figure 6:
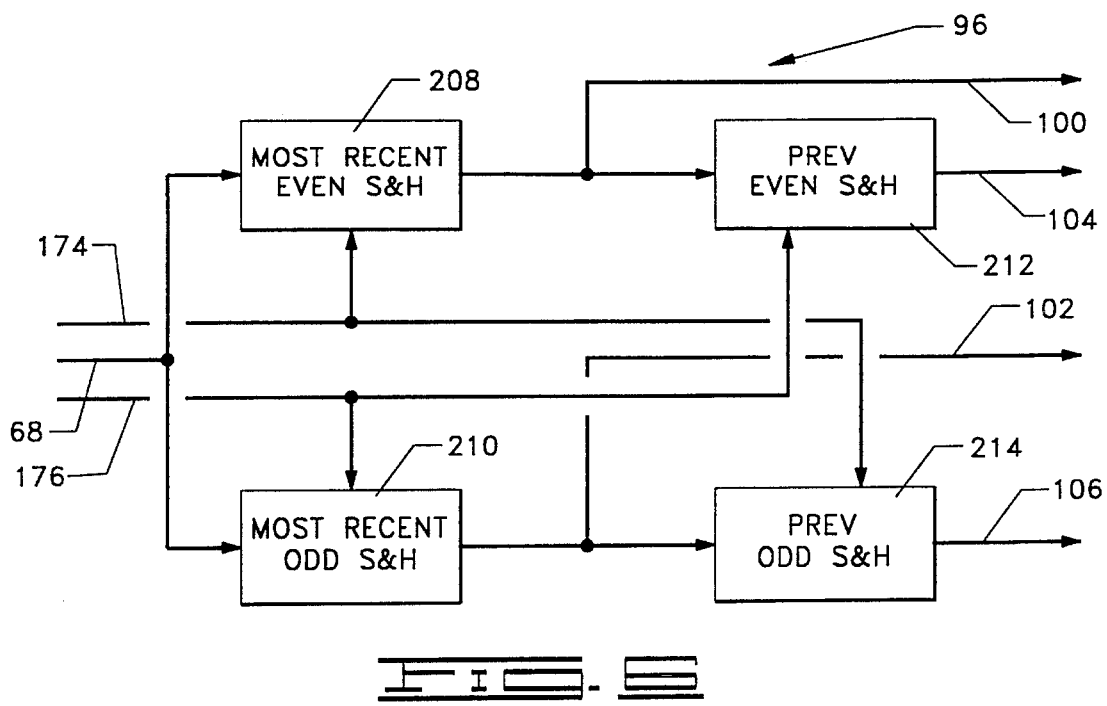
FIG. 6 is a block diagram of the sample generator of FIG. 3.
Figure 7:
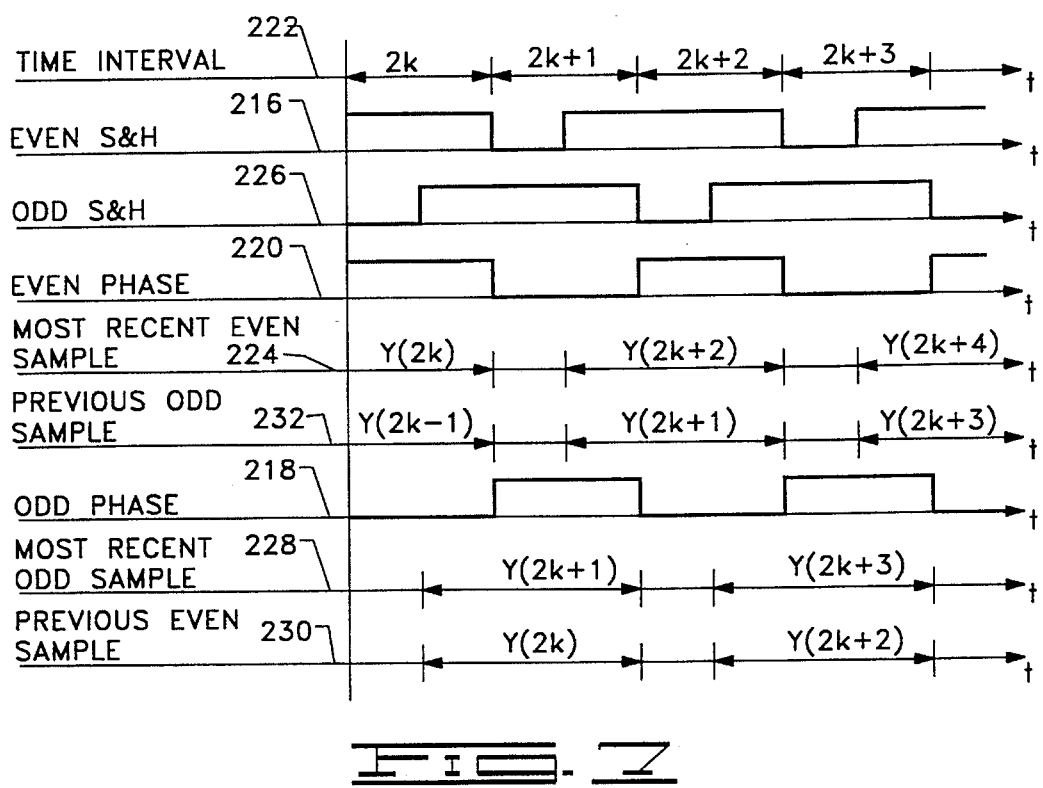
FIG. 7 is a timing diagram illustrating the samples stored in sample and hold circuits of the sample generator in relation to time.

Referring now to FIGS. 6 and 7, shown therein respectively are a block diagram of the sample generator 96 and a timing diagram that illustrates the operation of the sample generator 96 during the read mode of operation of the recording channel 20. As shown in FIG. 6, the sample generator 96 is comprised of two pairs of serially connected sample and hold circuits which, to facilitate an understanding of the invention, have been designated the most recent even sample and hold circuit 208, the most recent odd sample and hold circuit 210, the previous even sample and hold circuit 212 and the previous odd sample and hold circuit 214.

The inputs of the most recent even sample and hold circuit 208 and the most recent odd sample and hold circuit 210 both receive the output of the partial response filter 64 via the signal path 68 of FIG. 1 and are operated by timing signals received from the clock generator 140 to periodically sample the signal in the read channel 30 and store the sampled signal for a cycle of operation of the VCO 116. More particularly, the most recent even sample and hold circuit 208 receives the EVEN SAMPLE AND HOLD clock signal, reproduced at 216 in FIG. 7, so that the most recent even sample and hold circuit will track the signal in the read channel for the initial half of each odd phase of the read clock provided by the VCO 116, as can be seen by comparison of the EVEN SAMPLE AND HOLD clock signal and the ODD PHASE clock signal reproduced at 218 in FIG. 7, and commence storage of the value of the signal at the center of the odd phase. Consequently, the even sample and hold circuit 208 will contain a sample, referred to herein as the most recent even sample, of the signal in the read channel throughout each even cycle of operation of the VCO 116 identified by the EVEN PHASE clock signal that has been reproduced at 220 in FIG. 7. Thus, for example, throughout the even cycle of operation of the VCO 116 indicated as tinge interval (2k+2) on the time line 222 of FIG. 7, the most recent even sample and hold circuit 208 will store a most recent even sample, indicated by a double arrow as sample y(2k+2) on the line 224 of FIG. 7, that was taken during the preceding odd cycle of operation of the VCO 116. The most recent odd sample and hold circuit 210 similarly receives the ODD SAMPLE AND HOLD clock signal, reproduced at 226 in FIG. 7, to store a most recent odd sample of the signal in the read channel throughout each odd cycle of operation of the VCO 116 as indicated, for example, by the double arrow designated y(2k+1) on line 228 that extends throughout the time interval (2k+1) on the time line 222 of FIG. 7.

The input of the previous even sample and hold circuit 212 is connected to the output of the most recent even sample and hold circuit 208 and is operated by the ODD SAMPLE AND HOLD clock signal to sample the sample presently stored in the most recent even sample and hold circuit 208 during each even cycle of operation of the VCO 116. Thus, throughout each odd cycle of operation of the VCO 116, the previous even sample and hold circuit 212 will contain an even sample taken in the time interval immediately preceding the time interval in which the sample stored in the most recent odd sample and hold circuit 210 was taken. Thus, for example, in the odd time interval throughout which the most recent odd sample stored in the most recent odd sample and hold circuit 210 is the sample y(2k+1) taken in the even time interval 2k, the previous even sample in the previous even sample and hold circuit 214 will be the previous even sample y(2k), indicated by the double arrow along the line 230 in FIG. 7, taken in the odd time interval 2k−1. Thus, as can be seen from lines 218, 228 and 230 of FIG. 7, during each odd phase of operation of the VCO 116, the most recent odd sample and hold circuit 210 and previous even sample and hold circuit 212 will contain samples of the signal in the read channel 30 that were taken during the immediately preceding two cycles of operation of the VCO 116.

The input of the previous odd sample and hold circuit 214 is similarly connected to the output of the most recent odd sample and hold circuit 210 and responds to the EVEN SAMPLE AND HOLD clock signal on the signal path 174 to sample the sample in the most recent odd sample and hold circuit 210 during each odd cycle of operation of the VCO 116. Consequently, throughout each even cycle of operation of the VCO, as indicated by the EVEN PHASE clock signals on line 220 of FIG. 7, the most recent even sample and hold circuit 208 and previous odd sample and hold circuit 214 will contain samples taken in the two immediately preceding time intervals. Thus, for example, throughout the even time interval 2k+2, the most recent even sample and hold circuit 208 will contain the sample y(2k+2) taken during the time interval 2k+1 as shown on line 224 of FIG. 7 and the previous odd sample and hold circuit 214 will contain the sample y(2k+1) taken during the time interval 2k as indicated by the double arrow marked y(2k+1) on line 232 of FIG. 7.

Before continuing, it will be noted that, during each cycle of operation of the VCO 116, whether even or odd, one of the most recent sample and hold circuits, 208 and 210, will contain a sample taken during the immediately preceding cycle and one of the previous sample and hold circuits, that of parity opposite the most recent sample and hold circuit, will contain a sample taken in the next most immediately preceding cycle. Thus, during each cycle of operation of the VCO 116, the quantities y(k) and y(k−1) in equations (1) and (3) will be stored in two sample and hold circuits of the sample generator 96 and, further, the sample and hold circuits that contain the most recently obtained values for these quantities will be determined by the parity of the present VCO read clock cycle as identified by the logical values of the EVEN PHASE and ODD PHASE clock signals. Consequently, appropriate time and gain error signals can be generated in each cycle of operation using the contents of selected pairs of sample and hold circuits of the sample generator 96 and corresponding pairs of signals expressing the estimates x(k) and x(k−1) in equations (1) and (3). It is to the generation of these estimates that we now turn.

Referring once again to FIG. 3, the timing circuit 23 is further comprised of an estimate generator 234 that receives the samples stored in the most recent even and odd sample and hold circuits 208 and 210 respectively and generates digital expressions of the estimates that, in a read mode of operation of the timing circuit 23, are clocked through a shift register assembly 236 so that the shift register assembly will, during each cycle of operation of the VCO 116, contain even and odd, most recent and previous estimates corresponding to the even and odd, most recent and previous samples. These estimates are transmitted, on an even and odd basis, to the time error generator 108, by a phase selector 238 to enable the determination of even and odd time error signals in accordance with equation (1) in a manner that will be discussed below. The estimate generator has been more fully illustrated in FIG. 8 to which attention is now invited.

Figure 8:
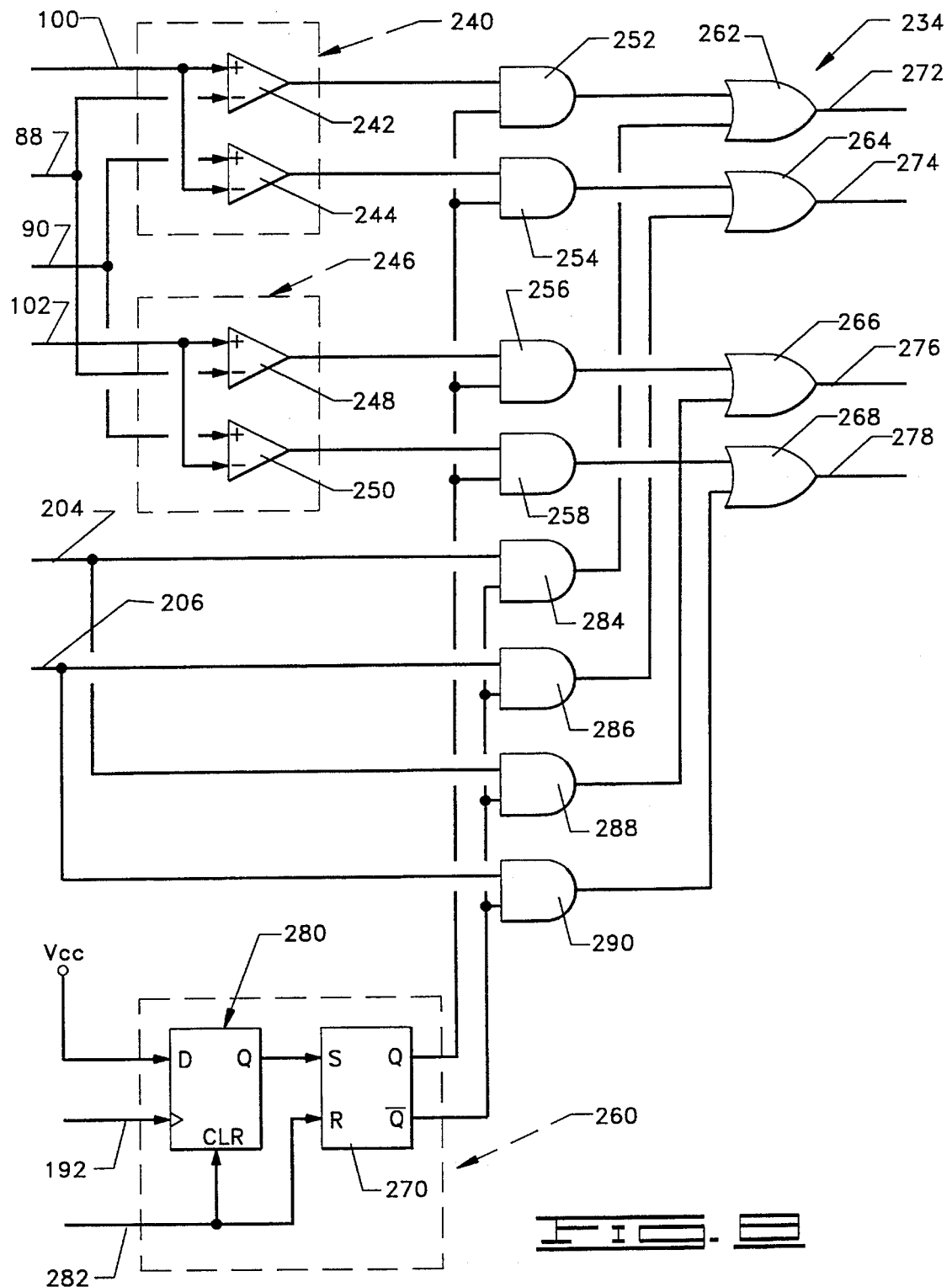
FIG. 8 is a block diagram of the comparator assembly and acquisition circuit of FIG. 3.

As shown in FIG. 8, the estimate generator is comprised of an even comparator assembly 240 that is, in turn, comprised of a positive even comparator 242 and a negative even comparator 244, each having one input connected to the output of the most recent even sample and hold circuit 208 via the signal path 100 of FIG. 6 that has been carried into FIG. 8. More particularly, the most recent even sample stored in the most recent even sample and hold circuit 208 is received at the noninverting input of the positive even comparator 242, the inverting input of which is connected to the reference generator 82 via the signal path 88 upon which the reference generator 82 provides a reference voltage at the level +A/2, while the inverting input of the negative even comparator 244 receives the most recent even sample and the noninverting input of the comparator 244 receives the reference level −A/2 on the signal path 90 from the reference generator 92. Thus, the even comparator assembly 240 will generate an estimate of the presence, in the most recent even sample and hold circuit 208, of a legitimate positive even sample that is expressed as a logical 1 at the output of the comparator 242 and a logical 0 at the output of the comparator 244, at such times that the most recent even sample value exceeds +A/2. Similarly, an estimate of the presence of a legitimate negative even sample is expressed as a logical 0 at the output of the comparator 242 and a logical 1 at the output of the comparator 244, and the absence of a legitimate nonzero even sample is expressed as logical 0's at the outputs of both comparators 242 and 244.

In a similar manner, the presence or absence of legitimate nonzero odd samples in the odd sample and hold circuit 210 are generated by an odd comparator assembly 246 that is comprised of a positive odd comparator 248, that receives the most recent odd sample on the signal path 102 from the most recent odd sample and hold circuit 210 at its noninverting input and the reference voltage +A/2 on the signal path 88 at its inverting input, and a negative odd comparator 250 that receives the most recent odd sample at its inverting input while receiving the reference level −A/2 on the signal path 90 at its noninverting input.

In the read mode of operation of the timing circuit, the even and odd estimates are transmitted to the shift register assembly 236 via AND gates 252 and 254, for the even estimates, and AND gates 258 and 260, for the odd estimates, that are enabled in the read mode by a mode selection circuit 260, and via OR gates 262 and 264, for the even estimates, and OR gates 266 and 268, for the odd estimates. More particularly, the mode selection circuit 260 is comprised of an RS flip flop 270 having a Q output that is connected to one input of each of the AND gates 252, 254, 256 and 258, the other inputs of which receive the outputs of the comparators 242, 244, 248 and 250 respectively, and the outputs of the AND gates 252, 254, 256 and 258 are connected to inputs of the OR gates 262, 264, 266 and 268 respectively so that the even estimate will appear on signal paths 272 and 274 leading from the outputs of the OR gates 262 and 264 respectively and the odd estimate will appear on signal paths 276 and 278 leading from the outputs of the OR gates 266 and 268 respectively at such times that the flip flop 270 is set. The signal paths 272, 274, 276 and 278 extend to the shift register assembly 236 as shown in FIG. 9.

Setting of the flip flop 270 is effected by a logical 1 received from the Q output of a type D flip flop having a D input connected to the positive terminal of the disc drive power supply (not shown) and a clock terminal connected to the clock generator 140 to receive the EVEN LATCH HOLD clock signal on the signal path 192. Thus, the AND gates 252, 254, 256 and 258 will be enabled by the first EVEN LATCH HOLD clock signal received in the absence of a signal that will clear the flip flop 280 and reset the flip flop 270. Such signal, an ACQUIRE signal provided by a controller of which disc drives are conventionally comprised, is transmitted to the clear terminal of the flip flop 280 and the reset terminal of the flip flop 270 via a signal path 282 during an acquisition mode of operation of the timing circuit 23 that will be discussed below. In such acquisition mode of operation of the timing circuit 23, the flip flop 270 will be reset and the Q̄ output of the flip flop is connected to inputs of AND gates 284 and 286, having outputs connected to the inputs of the OR gates 262 and 264 respectively, to provide substitutes for the even estimates and to the inputs of AND gates 288 and 290, having outputs connected to the inputs of the OR gates 266 and 268 respectively, to provide substitutes for the odd estimates for a purpose to be described below. Such estimate substitutes are provided by the POSITIVE ESTIMATE SUBSTITUTE and NEGATIVE ESTIMATE SUBSTITUTE clock signals generated by the clock generator 140 and appearing on the signal paths 204 and 206 of FIG. 4 respectively. As shown in FIG. 8, the signal paths 204 and 206 extend to inputs of the AND gates 284 and 286 respectively to provide a positive even estimate substitute, expressed as logical values 1 and 0 at the outputs of the OR gates 262 and 264 respectively, at such times that the POSITIVE ESTIMATE SUBSTITUTE clock signal is high and to provide a negative even estimate substitute, expressed as logical values 0 and 1 at the outputs of the OR gates 262 and 264 respectively, at such times that the NEGATIVE ESTIMATE SUBSTITUTE clock signal is high. The signal paths 204 and 206 similarly extend to inputs of the AND gates 288 and 290 to similarly provide positive and negative odd estimates at the outputs of the OR gates 266 and 268. The purpose of providing these estimate substitutes will be described below.

Figure 9:
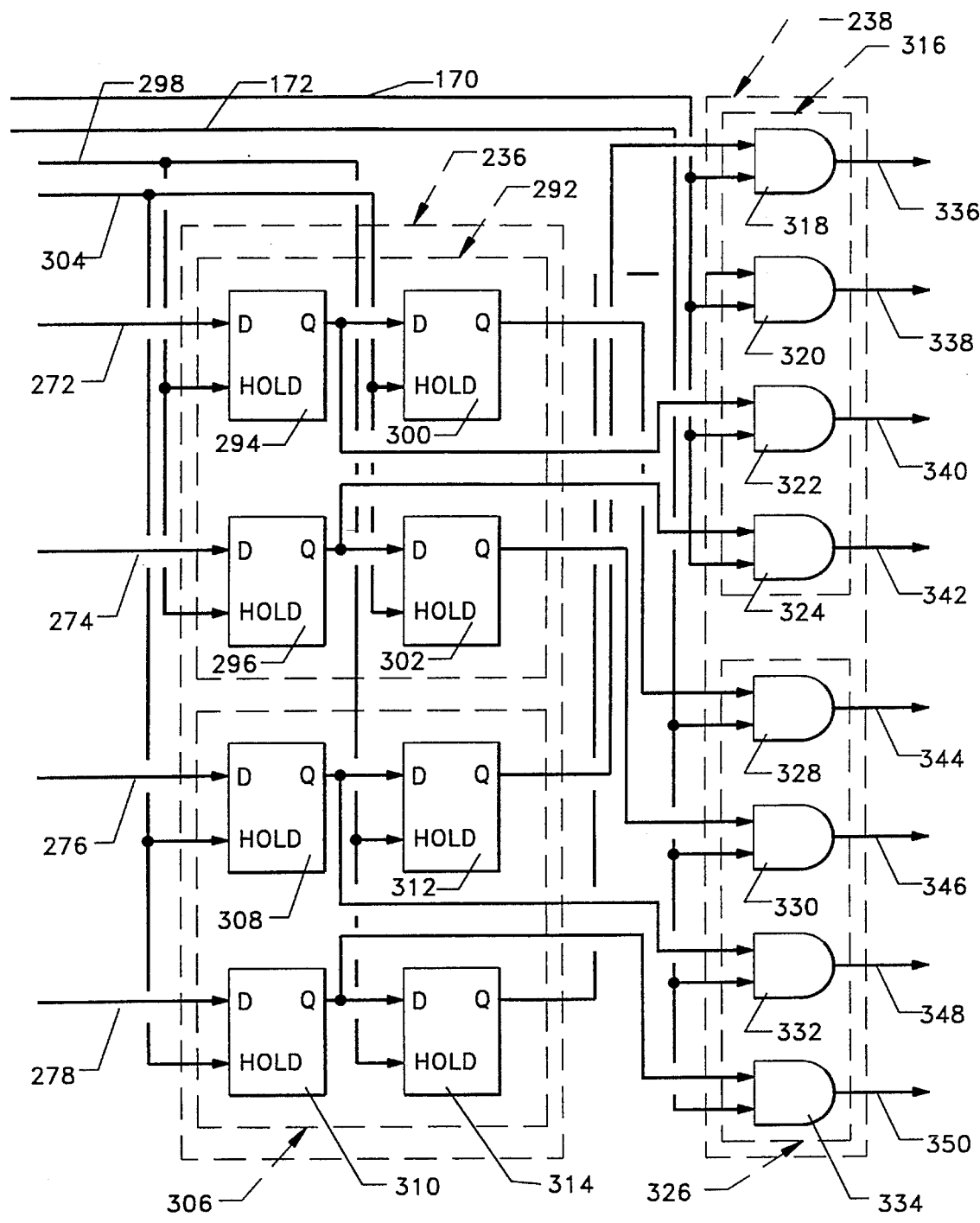
FIG. 9 is a circuit diagram for the shift register assembly and phase detector of FIG. 3.

Referring now to FIG. 9, shown therein are diagrams of the shift register assembly 236 and the phase selector 238 of the timing circuit 23 illustrated in FIG. 3. The shift register assembly 236 is comprised of a two-stage even shift register 292 that receives the even estimates on the signal paths 272 and 274 and is clocked, at times selected for each of the stages, to store a most recent even estimate, corresponding to the most recent even sample, throughout each even cycle of operation of the VCO 116 and to store a previous even estimate, corresponding to the previous even sample, throughout each odd cycle of operation of the VCO. To this end, the first stage of the even shift register is comprised of type D latches 294 and 296 having D inputs that receive the even estimates on the signal paths 272 and 274 and a hold terminal that receives the EVEN LATCH HOLD clock signal generated by the clock generator 140 of FIG. 3 on a signal path indicated at 298 of FIG. 9. The second stage of the even shift register 292 is similarly comprised of two type D latches 300 and 302 that are serially connected to the latches 294 and 296 respectively and clocked by the ODD LATCH HOLD clock signal generated by the clock generator 140 via a signal path 304 in FIG. 9.

An odd shift register 306, comprised of a first stage including type D latches 308 and 310 which receives the odd estimates on the signal paths 276 and 278 and a second stage, comprised of type D latches 312 and 314 serially connected to the latches 308 and 310 of the first stage, similarly stores a most recent odd estimate, corresponding to the most recent odd sample, throughout each odd cycle of operation of the VCO 116 and a previous odd estimate, corresponding to the previous odd sample, throughout each even cycle of operation of the VCO 116. To this end, and as will be described below with respect to a timing diagram presented in FIG. 10, the first stage of the odd shift register 306 is clocked by the ODD LATCH HOLD clock signal received on the signal path 304 from the clock generator 140 and the second stage of the odd shift register 306 is clocked by the EVEN LATCH HOLD clock signal received on the signal path 298.

As further shown in FIG. 9, the phase selector 238 is comprised of an even phase selector 316, comprised in turn of AND gates 318, 320, 322 and 324 that are enabled during each even cycle of operation of the VCO 116 by an EVEN PHASE clock signal received from the clock generator 140 on the signal path 170, and an odd phase selector 326 that is comprised of AND gates 328, 330, 332 and 334 that are enabled by ODD PHASE clock signals received on the signal path 172. The remaining inputs of the AND gates 318 and 320 are connected to the Q outputs of the latches 312 and 314 respectively to receive the previous odd estimates stored therein; the remaining inputs of the AND gates 322 and 324 are connected to the Q outputs of the latches 294 and 296 respectively to receive the most recent even estimates stored therein; the remaining inputs of the AND gates 328 and 330 are connected to the Q outputs of the latches 300 and 302 respectively to receive the previous even estimates stored therein; and the remaining inputs of the AND gates 332 and 334 are connected to the Q outputs of the latches 308 and 310 respectively to receive the most recent odd estimates stored therein. The outputs of the AND gates 318, 320, 322 and 324 are impressed on signal paths 336, 338, 340 and 340 respectively, which have been carried into FIGS. 11 and 12, are used in the generation of even time and gain error signals during even cycles of operation of the VCO 116 as will be discussed below. Similarly, the outputs of AND gates 328, 330, 332 and 334 are impressed on signal paths 344, 346, 348 and 350 respectively, similarly carried into FIGS. 11 and 12, for use in the generation of odd time and gain error signals during odd cycles of operation of the VCO 116. Before discussing the generation of the even and odd time and gain error signals, it will be useful to consider the combined operation of the estimate generator 234, the shift register assembly 236 and the phase selector 238 and FIG. 10 has been provided for this purpose.

Figure 10:
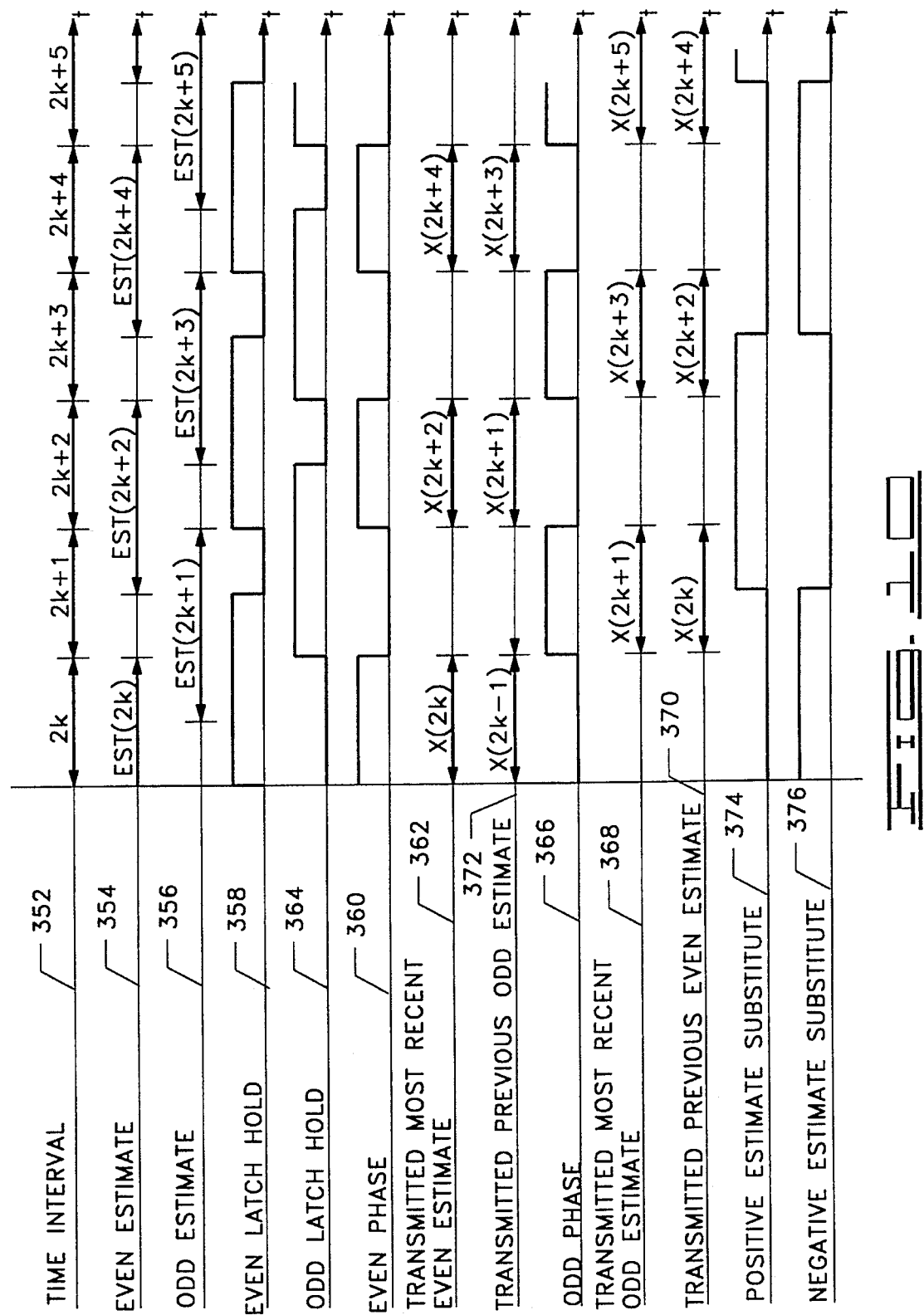
FIG. 10 is a timing diagram illustrating the generation of estimates in relation to time.
Figure 14:
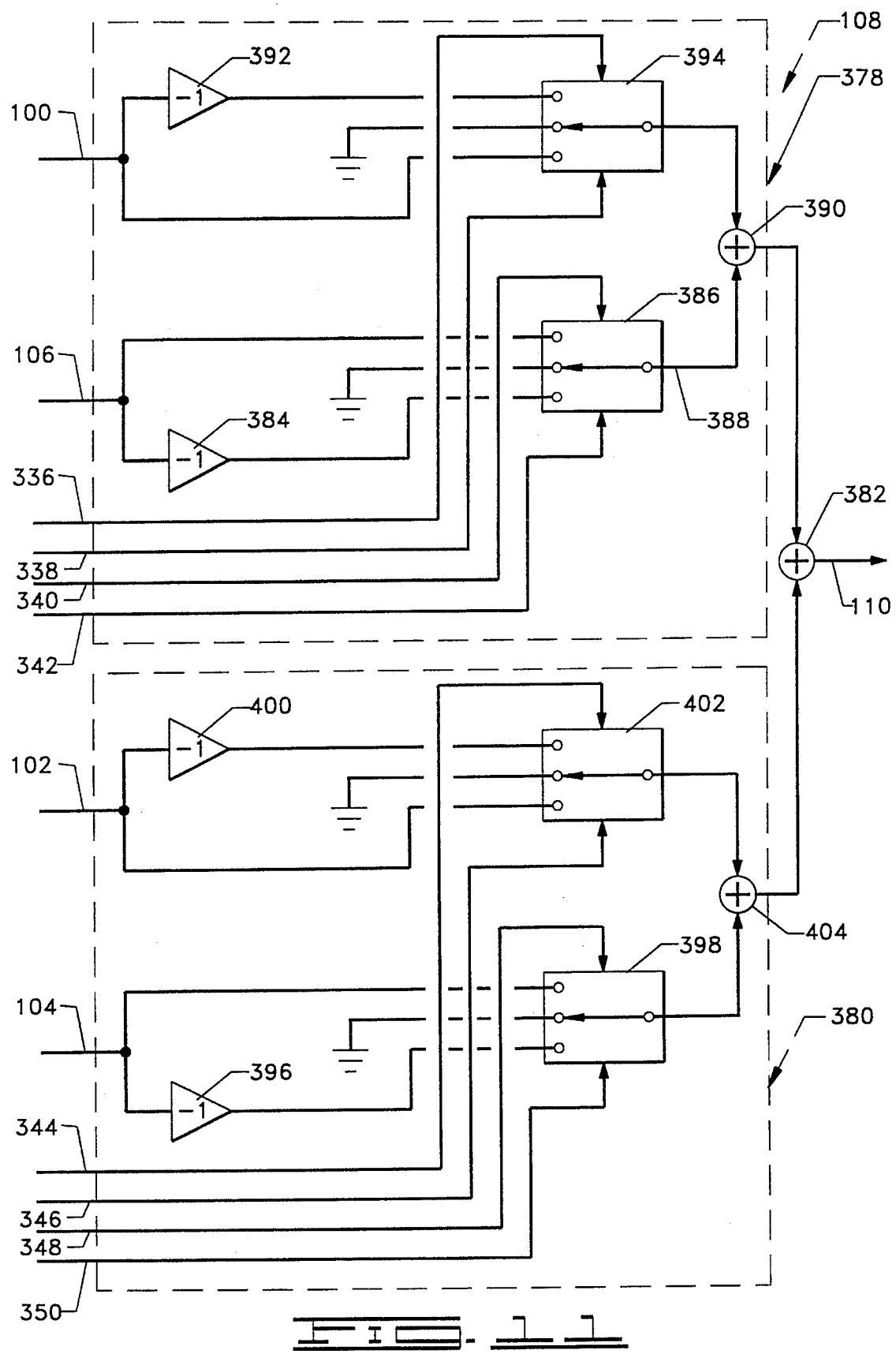

Referring to FIG. 10, shown along the line designated by the reference numeral 352 are successive even and odd cycles of operation of the VCO 116 corresponding to the cycles of operation of the VCO 116 illustrated at 222 in FIG. 7. As will be clear from the electrical connections between the shift registers of the shift register assembly 236 and the comparators of the estimate generator 234 described above, an even estimate will appear at the outputs of the even comparator assembly 240 concurrently with the appearance of the most recent even sample in the most recent even sample and hold circuit 208; that is, in the center of each odd cycle of operation of the VCO 116 as indicated along line 354 of FIG. 10. Moreover, an even estimate will remain at the outputs of the even comparator 240 so long as a most recent even sample remains in the even sample and hold circuit 208; that is, throughout the ensuing even cycle of operation of the VCO 116. Thus, for example, the even estimate indicated by the double arrow designated Est(2k+2) will be generated in the odd time interval (2k+1) and remain at the outputs of the even comparator assembly 240 throughout the even VCO clock cycle (2k+2). Similarly, the odd comparator assembly 246 will generate odd estimates during each even cycle of operation of the VCO 116 and such estimate will remain at the outputs of the odd comparator 246 throughout the ensuing odd cycle of operation of the VCO 116. Thus, for example, the odd estimate indicated by the double arrow designated EST(2k+3) on line 356 of FIG. 10 will be generated in the time interval (2k+2) and will remain at the output of the odd comparator assembly throughout the odd time interval (2k+3).

The EVEN LATCH HOLD clock signal, reproduced at 358 in FIG. 10, rises at the beginning of each even cycle to enter the even estimate at the output of the even comparator assembly 240 into the first stage of the even shift register 292 and such estimate will remain in the first stage of the of the even shift register until the beginning of the next even cycle. More particularly, during each even cycle of operation of the VCO, the first stage of the even shift register 292 will contain a most recent even estimate that is held throughout the even cycle and, further, such most recent even estimate will be derived from the most recent even sample that is concurrently stored in the most recent even sample and hold circuit. This most recent even estimate will be transmitted to the time error generator 108 throughout the even cycle by the even phase selector 316 in response to an EVEN PHASE clock signal that is high during each even cycle of operation of the VCO 116 as indicated on line 360 of FIG. 10. Thus, for example, the time error generator 108 will receive the most recent even estimate indicated by the double arrow designated x(2k+2) on line 362 of FIG. 10 throughout the even cycle (2k+2) of operation of the VCO 116 during which, as shown in FIG. 7, the most recent even sample y(2k+2) from which the estimate x(2k+2) is derived, will be contained in the most recent even sample and hold circuit 208. It will be noted that this most recent even estimate will not be transmitted to the time error generator 108 during an odd cycle because the EVEN PHASE clock signal is a logical 0 during each odd cycle of operation of the VCO clock 116. Thus, the transmitted most recent estimates appear at the output of the even phase selector only during even cycles of operation of the VCO 116. This significance of this point will become clear below.

The ODD LATCH HOLD signal, reproduced at 364 in FIG. 10, similarly rises at the beginning of each odd cycle of operation of the VCO 116 to enter the odd estimate derived from the most recent odd sample in the most recent odd sample and hold circuit 210 into the first stage of the odd shift register 306. This estimate is transmitted to the AND gates 332 and 334 of the odd phase selector, which is enabled by the ODD PHASE clock signals reproduced at in FIG. 10, so that a most recent odd estimate will be transmitted to the time error generator 108 during each odd cycle of operation of the VCO 116 along with a most recent odd sample, stored in the most recent odd sample and hold circuit 210, from which the most recent odd estimate is derived. Thus, for example, throughout the odd time interval 2k+1, the most recent odd estimate stored in the first stage of the odd shift register 306 will be transmitted to the time error generator 108 as indicated by the double arrow designated x(2k+1) on line 368 of FIG. 10 along with the most recent odd sample indicated by the double arrow y(2k+1) on line 228 of FIG. 7.

In the same manner that even samples stored in the most recent even sample and hold circuit 208 throughout each even cycle of operation of the VCO 116 give rise to previous even samples that are stored in the previous even sample and hold circuit 212 throughout the ensuing odd cycle of operation, the clocking of the second stage of the even shift register 292 by the ODD LATCH HOLD clock signal causes the most recent even estimate stored in the first stage of the even shift register 292 to give rise to a previous even estimate that is stored in the second stage of the even shift register throughout the ensuing odd cycle of operation of the VCO. This previous even estimate is transmitted to the time error generator 108 during the odd cycle via the AND gates 328 and 330 of the odd phase selector 326; that is, at a time that the even sample from which the estimate was derived is transmitted to the time error generator 108. Thus, for example, the previous even estimate indicated as x(2k) along the line 370 in FIG. 10 will be transmitted to the time error generator 108 in the odd time interval (2k+1) throughout which the time error generator 108 receives the previous even sample y(2k) indicated along the line 230 of FIG. 7. Similarly, the clocking of the second stage of the odd shift register 306 by the EVEN LATCH HOLD clock signal causes the most recent odd estimate stored in the first stage of the odd shift register 306 to give rise to a previous odd estimate that is stored in the second stage of the odd shift register 306 throughout the ensuing even cycle of operation of the VCO. This previous odd estimate is transmitted to the time error generator 108 during the even cycle via the AND gates 318 and 320 of the even phase selector 316; that is, at a time that the odd sample from which the estimate was derived is transmitted to the time error generator 108. Thus, for example, the previous odd estimate indicated as x(2k+1) along the line 372 in FIG. 10 will be transmitted to the time error generator 108 in the succeeding even time interval (2k+2) throughout which the time error generator 108 receives the previous odd sample y(2k+1) indicated along the line 228 of FIG. 7.

It will thus be seen that, during each even cycle of operation of the VCO 116 while the timing circuit 23 is operated in the read mode, the most recent even sample taken during the preceding odd cycle of operation of the VCO 116, the most recent even estimate derived from such most recent even sample, the previous odd sample taken during the preceding even cycle and the previous odd estimate derived therefrom will be presented to the time error generator 108. Conversely, during each odd cycle of operation of the VCO 116, the most recent odd sample taken during the preceding even cycle of operation of the VCO 116, the most recent odd estimate derived from such most recent odd sample, the previous even sample taken during the preceding odd cycle and the previous even estimate derived therefrom will be presented to the time error generator 108. Thus, the information necessary to generate a time error signal in accordance with equation (1) will be presented to the time error generator throughout each even cycle and throughout each odd cycle of operation of the VCO 116. Before proceeding to the generation of the time error signal, it will be useful to first discuss the manner in which the substitutes for the estimates are generated during the acquisition mode of operation of the timing circuit 23.

Returning to FIG. 8 and as discussed above, during the acquisition mode of operation of the timing circuit 23, the flip flop 270 is reset to disable gates 252, 254, 256 and 258 by means of which estimates generated by the estimate generator 234 are transmitted to the shift register assembly 236 and enable gates 284, 286, 288 and 290 that receive the positive and negative estimate substitutes on the signal paths 204 and 206. As shown along lines 374 and 376 of FIG. 10, reproduced from the timing diagram of FIG. 5, the POSITIVE ESTIMATE SUBSTITUTE clock signal and NEGATIVE ESTIMATE SUBSTITUTE clock signal are complementary so that the outputs of the AND gates 284 and 286 will alternate between the logical expressions 10 and 01. But the expression 10 corresponds to the detection of a sample for which the estimate x(k) in equation (1) has the value+1 during the read mode of operation of the timing circuit 23 and the expression 01 corresponds to the detection of a sample for which the estimate x(k) has the value −1 as such estimates would be determined by the even and odd comparator assemblies 240 and 246 respectively. Thus, during the acquisition mode of operation of the timing circuit 23, the AND gates 252 and 254, and, consequently, the OR gates 262 and 264 provide substitute estimates for the even estimates generated by the even comparator assembly 240 during the read mode of operation of the timing circuit 23 and such substitute estimates alternately have the values of +1 and −1. Similarly, the AND gates 256 and 258, and, consequently, the OR gates 266 and 268 provide substitute estimates for the odd estimates generated by the odd comparator assembly 246 and such substitute estimates similarly alternate between the values of +1 and −1. Returning to FIG. 10, it is seen on line 374 that the POSITIVE ESTIMATE SUBSTITUTE and NEGATIVE ESTIMATE SUBSTITUTE clock signal are high during alternating time intervals which each include a rising edge of an EVEN LATCH HOLD clock signal and an ODD LATCH HOLD clock signal. Thus the mode selection circuit 260 of FIG. 8 can be used to force the generation of estimates which take on the series of values . . . +1, +1, −1, −1, +1, +1, −1, −1, . . . . The use of such forced estimates will be discussed below.

Referring now to FIG. 11, shown therein is a circuit diagram for the time error generator 108 of FIG. 3. In general, the time error generator 108 is comprised of an even time error generator 378 that generates an even time error signal during even cycles of operation of the VCO 116, an odd time error generator 380 that generates an odd time error signal during odd cycles of operation of the VCO 116, and an adder 382 connected to the outputs of even and odd time error generators 378 and 380 to alternately transmit the even and odd time error signals to the VCO 116 via the signal path 110 that carried into FIG. 11 from FIG. 3.

As shown in FIG. 11, the even time error generator receives the previous odd sample stored in the previous odd sample and hold circuit 214 on the signal path 106, carried into FIG. 11 from FIG. 3, and is comprised of a unity gain, previous odd sample amplifier 384 that generates the negative of the previous odd sample; that is, a signal equal in magnitude to the previous odd sample but of opposite polarity thereto. The even time error generator is further comprised of a three way previous odd selector switch 386 having one input terminal which receives the previous odd signal on the signal path 106 at one input terminal, a second input terminal connected to the output of the previous odd sample amplifier 384 to receive the negative of the previous even sample, and one terminal connected to a the ground from which the reference voltages +A, −A, +A/2 and −A/2 are measured. The previous odd selector switch 386 is further connected to the AND gates 322 and 324 of the even phase selector 316, via the signal paths 340 and 342 that have been carried into FIG. 11 from FIG. 9, so that, during each even cycle of operation of the VCO 116, the previous odd selector switch 386 receives the most recent even estimate that is stored in the first stage of the even shift register 292.

In the practice of the present invention, the most recent even estimate is utilized as a control signal that selects the previous odd sample, it's negative or the voltage reference ground for transmission by the previous odd selector switch 386. More particularly, at such times that the most recent even sample has a value exceeding the reference level +A/2; that is, at such times that the most recent estimate is +1, the output of the even comparator assembly 240 will be expressed digitally as 10 and, as so expressed, will be stored in the first stage of the even shift register 292 as the most recent even estimate. Consequently, a logical 1 will appear on the signal path 340 and such logic level is utilized to provide an internal connection through the switch 386 for the previous odd sample on the signal path 106. At such times that the most recent even sample has a value of less than −A/2 so that the most recent estimate is −1, a logical 1 will appear on the signal path 342 to provide an internal connection through the switch 386 for the negative of the previous odd sample at the output of the previous odd sample amplifier 384. At other times, corresponding to the presence of a most recent even estimate of 0, logical 0's will appear on both signal paths 340 and 342 so that the switch 386 will transmit the reference voltage ground. Thus, during each even cycle of operation of the VCO 116, the operation of the switch 386, the amplifier 384 and the connections thereto of the signal path 106 from the previous odd sample and hold circuit 214 and the signal paths 340 and 342 leading to the first stage of the even shift register 292 wherein the most recent even estimate is stored during will be to multiply the previous odd sample by +1, 0, or −1, depending upon the value of the most recent even sample presently stored in the most recent sample and hold circuit 208 and transmit the product. Referring to equation (1), it will be seen that this product is the first term of such equation (1) during an even cycle of operation of the VCO 116. This product, expressed on the signal path 388 of FIG. 11 is supplied to one input of an adder 390.

The even time error generator 378 is further comprised of a unity gain, inverting most recent even sample amplifier that receives the most recent even sample on the signal path 100 from the most recent even sample and hold circuit 208 and supplies the negative of the most recent even sample to a three way most recent even selector switch 394 that also receives the most recent even sample on the signal path 100, the reference ground voltage and the previous odd estimate on the signal paths 336 and 338. As in the case of the switch 386, the switch 394 responds to the digital expression of the previous odd estimate on the signal paths 336 and 338 to transmit the most recent even sample, its negative or zero. However, the signal path 100 and the amplifier 392 are connected to the switch 394 so that the internal connection formed through the switch 394 in response to a previous odd estimate of +1, expressed digitally on the signal paths 336 and 338 as 10, will result in transmission of the negative of the most recent even sample while a previous odd estimate of −1 will result in the transmission of the most recent even sample. Such reversal in the connections to the switches 386 and 394 provides for the negative sign in equation (1) so that the output of the switch 394 during each even cycle of operation of the VCO is the second term of equation (1), including the negative sign before such term, wherein x(k−1) is the previous odd estimate stored in the second stage of the odd shift register 306 during that even cycle of operation and y(k) is the most recent even sample stored in the most recent even sample and hold register during such even cycle of operation of the VCO 116. The output of the switch 394 is connected to a second input of the adder 390 so that the output of the adder 390 is a time error signal generated in accordance with equation (1) during an even cycle of operation of the VCO 116 from the samples taken during the two most recently preceding cycles of operation of the VCO 116 and estimates generated from such samples.

The odd time error generator 380 is similarly comprised of: a unity gain, inverting previous even amplifier 396 which receives the previous even sample on the signal path 104 and generates the negative of that sample; a three way previous even selector switch 398 that receives the output of the amplifier 396, the previous even sample on the signal path 104, the reference voltage ground and the digital expression of the most recent odd estimate stored in the first stage of the odd shift register 306 and expressed on the signal paths 348 and 350 to generate a signal expressive of the first term of equation (1) during odd cycles of operation of the VCO 116; a unity gain, inverting most recent odd amplifier 400 which receives the most recent odd sample on the signal path 102 and generates the negative of that sample; a three way most recent even selector switch 402 that receives the output of the amplifier 400, the most recent odd sample on the signal path 102, the reference voltage ground and the digital expression of the previous even estimate stored in the second stage of the even shift register 292 and expressed on the signal paths 344 and 346 to generate a signal expressive of the second term of equation (1) during odd cycles of operation of the VCO 116; and an adder 404 that combines the outputs of the switches 398 and 402 to produce an odd time error signal in each odd cycle of operation of the VCO 116 from samples taken in the two most immediately preceding even and odd cycles.

As noted above, the AND gates 318, 320, 322 and 324 of the even phase selector 316 are disabled during odd cycles of operation of the VCO 116 and, similarly, the AND gates 328, 330, 332 and 334 of the odd phase selector 326 are disabled during even cycles of operation of the VCO 116. Consequently, only one of the even and odd time error generators 378 and 380 is operative during each cycle of operation of the VCO 116. The outputs of the adders 390 and 404 of the even and odd time error generators 378 and 380 respectively are connected to inputs of the adder 382 that is supplies a signal to the signal path 110 of FIG. 3. Returning to FIG. 3, it will thus be seen that a time error signal generated in accordance with equation (1) will be transmitted to the input of the VCO 116 at such times that the switch 112 is closed by reception of a read gate signal.

OPERATION OF THE TIMING CIRCUIT

At times that data is being written to the disc 28, the read gate signal on the signal path 122 of FIG. 3 will be low to prevent transmission of the error signal generated by the sample generator 96, the time error generator 108, the estimate generator 234, the shift register 236 and phase selector 238 to the VCO 116. Instead, the switch 112 remains open so that the read VCO 116, the phase selector 128, and charge pump 124 form a conventional phase locked loop that is locked to signals issuing from the zone clock synthesizer 132 to provide a write clock utilized to control the encoding of user data and clocking of data to the write driver 50 (FIG. 1) at a rate that has been selected for the data track on which the data is to be stored.

Similarly, between data transfer operations in which data is read from a data track, the read gate will be low to cause the switch 112 to transmit the output of the charge pump 124 to the VCO 116 so that the read clock provided by the VCO 116 will remain locked to a zone clock provided by the zone clock synthesizer 132. Consequently, since writing to a selected data track is carried out using a write clock locked to clock signals provided by the zone clock synthesizer 132, the VCO 116 will generate a read clock differing only in phase from the read clock that is to be used during the reading of stored data from such data track. Thus, all that need be done to establish appropriate clocks for reading data is to adjust the phase of the VCO 116 to cause the clock generator to generate sample and hold clock signals that are synchronized with the sampling points dictated by the nominal signal shown in FIG. 2.

During reading, the read gate signal on the signal path 122 is held high with the result that the switch 112 will be closed to cause time error signals generated as described above from signals generated by stored data to be transmitted to the VCO 116 to maintain sampling at the moments dictated by the nominal waveform indicated by FIG. 2. However, prior to reading user data, an initial lock to the data on a data track must be acquired and the present invention provides for rapidly attaining such lock as will now be described.

To provide for the initial phasing of the read clock provided by the VCO 116, it is common practice to include in the header of each sector that contains stored data a preamble which, ideally, will produce a sine wave, illustrated at 406 in FIG. 2, at the output of the filter 64 as the preamble passes the read/write head 54. The sine wave, which can be produced by transmitting a sequence of bits all having the logic value 1 to the precoder 42 when the header is written, is a superposition of signals which each have the nominal form and the maxima and minima for the sine wave, when referred to desired sampling moments of the nominal signal, occur at points halfway between alternate pairs of the sampling moments. Between each pair of such sampling moments, the sine wave will have a value of zero. Once a lock on the sine wave is obtained, the lock is stable so that the phase of the VCO 116 will be such to cause samples to be taken at substantially the times dictated by the nominal signal once the reading of data begins.

However, as is known in the art, a timing circuit utilizing equation (1) above can settle on the peaks and zeros of the sine wave produced by the preamble so that the VCO 116 will be a quarter period out of phase with the nominal moments. As shown by the curve 406 in FIG. 2, successive samples taken halfway between the desired sampling moments in the absence of noise will be zero and substantially ±1.41 A. Thus, one term of equation (1) will be substantially zero, because the sample has an amplitude of substantially zero, and the other term will be zero because the estimate in the term is zero and such will be the case even though the signal issuing from the filter 64 at the time this other sample is taken will have a maximum value. Thus, the time error signal will be zero and the VCO 116 will operate stably to generate clock signals displaced a quarter period from desired clock times.

To avoid this problem, nonzero estimate substitutes are provided to the time error generators 378 and 380 from the clock generator 140 utilizing the mode selection circuit 260 shown in FIG. 8. Specifically, during the passage of the preamble, a high acquire signal is provided on the signal path 282 of FIG. 8, to reset the flip flop 270. Reset of the flip flop 270 disables the AND gates 252, 254, 256 and 258 that transmit the estimates generated by the comparator assemblies 240 and 246 to the OR gates 272, 274, 276 and 278 that are connected to the shift registers 292 and 306 and enables the AND gates 284, 286, 288, and 290 that receive the POSITIVE ESTIMATE SUBSTITUTE and NEGATIVE ESTIMATE SUBSTITUTE clock signals on the signal paths 204 and 206. Consequently, since the estimate substitutes are either +1 or −1, a low value for one term of equation (1), resulting from a small sample value taken at the midpoint between two desired sample times during passage of the preamble, will necessarily result in the other term having a large value. Thus, the timing circuit will be forced to rapidly adjust itself to a phase for the VCO 116 for which the terms of equation (1) substantially cancel for successive samples having the amplitudes +A and −A that occur at ideal sample times for the preamble. Such phase occurs only for the correspondence of the sample values +A and −A to the estimates +1 and −1 respectively; that is, for the ideal sample times.

THE GAIN CONTROL CIRCUIT

Referring now to FIG. 12, shown therein is a block diagram of a gain control circuit 408 of which the timing and gain control circuit 22 is further comprised. As shown in FIG. 12, the gain control circuit 408 is comprised of: a peak detector 410 which receives the signal at the output of the filter 64 on the signal path 68 that has been carried into FIG. 12 from FIG. 1; a double throw electronic switch 412 having one input terminal connected to the output of the peak detector 410; a gain error generator 414 whose output connects to the other input of the switch 412; and a filter 416 connected to the output of the switch 412. The output of the switch 412 connects to the signal path 62, carried into FIG. 12 from FIG. 1, which provides gain control for the VGA 58 of FIG. 1. The switch 412 normally connects the output of the peak detector 410 to the VGA 58 so that gain control can be effect, except at such times that a data track is being read, in a conventional manner. During reading of data, switch 412 responds to the read gate signal on the signal path 122 to transfer gain control to the gain error generator 414 to permit gain control in accordance with equation (2) above.

As in the case of timing control, gain control during reading is effected on an even cycle, odd cycle basis, the gain error generator being comprised of an even gain error generator 418 and an odd gain error generator 420 for this purpose. Specifically, the even gain error generator 418 receives: the most recent even and previous odd samples on the signal paths 100 and 106 that have been carried into FIG. 12 from FIG. 6; the most recent even and previous odd estimates on the signal paths 336, 338, 340 and 342 that have been carried into FIG. 12 from FIG. 9; and reference signals +A and −A on the signal paths 84 and 86 that have been carried into FIG. 12 from FIG. 1 and utilizes such signals to generate an even gain error signal during each even cycle of operation of the VCO 116. Similarly, the odd gain error generator 418 receives: the most recent odd and previous even samples on the signal paths 102 and 104 that have been carried into FIG. 12 from FIG. 6; the most recent odd and previous even estimates on the signal paths 344, 346, 348 and 350 that have been carried into FIG. 12 from FIG. 9; and reference signals +A and −A on the signal paths 84 and 86 that have been carried into FIG. 12 from FIG. 1 and utilizes such signals to generate an odd gain error signal during each odd cycle of operation of the VCO 116. The even and odd gain error signals are transmitted to the inputs of an adder 422 which transmits the even gain error signal to the switch 412 during even cycles of operation of the VCO 116 and transmits the odd gain error signals to the switch 412 during odd cycles of operation of the VCO 12. The even and odd gain error generators, 418 and 420 respectively, are constructed identically and such construction has been illustrated in FIG. 13 wherein is presented the circuit diagram of the even gain error generator 418.

As shown in FIG. 13, the even gain error generator 418 is comprised of a most recent section 425 that is, in turn, comprised of a subtracter that receives the most recent even sample on the signal path 100 and the reference level +A on the signal path 84 to generate a signal having a magnitude that can be expressed as $y(k)-A$, where $y(k)$ is the value of the most recent even sample, on a signal path 426. It will be noted that, where the ideal value of the sample $y(k)$ is +A, so that the corresponding estimate is +1, the first term of equation (3) would similarly be $y(k)-A$. The most recent section 425 of the even gain error generator 418 is further comprised of a subtracter 428 that similarly receives the most recent even sample on the signal path 100 and further receives the reference level −A on the signal path 86 to generate a signal having a magnitude that can be expressed as $-[y(k)+A]$; that is, the value of the first term of equation (3) for an ideal most recent even sample value of −A. Thus, the subtracter 424 generates a signal having a magnitude given by the first term of equation (3) for the case in which the most recent even estimate is +1 and the subtracter 428 generates a signal having a magnitude given by the first term of equation (3) for the case in which the most recent even estimate is −1. These signals are transmitted to two of the inputs of a three way switch 432 having a third input that is connected to the ground for the reference signals +A and −A. The switch 432 further receives, as control signals, the most recent even estimate on the signal paths 336 and 338 and transmits the output of the subtracter 424 at such times that the signal path 336 is high, corresponding to an estimate of +1, transmits the output of the subtracter 428 at such times that the signal path 338 is high, corresponding to an estimate of −1, and transmits the reference ground at such times that the signal paths 336 and 338 are both low corresponding to an estimate of 0 or to disablement of the AND gates 318 and 320 of FIG. 9 during odd cycles of operation of the VCO 116. Thus, the most recent even section generates a signal that has a magnitude expressed by the first term of equation (3) from the most recent even sample and the most recent even estimate during each even cycle of operation of the VCO 116. This signal is transmitted to one input of an adder 434.

The even gain generator 418 is further comprised of a previous section 436 that is constructed identically to the most recent section 425 to include subtracters 438 and 440 and a three way switch 442 interconnected in the same manner that the subtracters 424 and 428 and the switch 432 interconnected. The previous section 436 receives the previous odd sample on the signal path 106, in place of the most recent even sample on the signal path 100, and receives most previous odd estimate on the signal paths 336 and 338, in place of the most recent even estimate on the signal paths 340 and 342, to generate a signal having a value expressed by the second term of equation (3) during each even cycle of operation of the VCO 116. This signal is transmitted to the other input terminal of the adder 434 to generate an even gain error signal having a magnitude expressed by equation (3) during each even cycle of operation of the VCO 116. The even gain error signal at the output of the adder 434 is transmitted to the adder 422 via a signal path 444.

As noted above, the odd gain error generator 420 is identical to the even gain error generator 418; only the signals received by the odd gain error generator 420 differ. Specifically, in place of the most recent even sample on the signal path 100 that is received by the even gain error generator 418, the odd gain error generator receives the most recent odd sample on the signal path 102. In place of the previous odd sample received by the even gain error generator 418 on the signal path 106, the odd gain error generator receives the previous even sample on the signal path 104. In place of the most recent even estimate received by the even gain error generator 418 on the signal paths 340 and 342, the odd gain error generator receives the most recent odd estimate on the signal paths 348 and 350. In place of the previous odd estimate received by the even gain error generator 418 on the signal paths 336 and 338, the odd gain error generator 420 receives the previous even estimate on the signal paths 344 and 346. Consequently, the odd gain error generator 420 will operate during odd cycles of operation of the VCO 116 in a manner that is identical to the operation of the even gain error generator 418 during even cycles of operation of the VCO 116 to generate an odd gain error signal that is complementary to the even gain error signal. This odd gain error signal is transmitted to the adder 422 on the signal path 446 of FIG. 12. Thus, during the read mode of operation of the timing circuit 23 wherein the read gate signal on signal path 122 is high to operate the switch 412 to transmit the signal at the output of the adder 422, the gain control circuit 408 generates a gain error signal during each cycle of operation of the VCO 116, from samples taken during the previous two cycles and estimates generated from such cycles, and outputs the gain error signal to the variable gain amplifier 58 of FIG. 1.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A timing and gain control circuit for controlling the timing of sampling of a signal induced in a PRML read channel for a disc drive and the amplitude of said signal, comprising:

reference generator means for generating a plurality of reference voltage levels selected in relation to the amplitude of a nominal channel signal;

a timing circuit, comprising:

a VCO for generating a read clock at a frequency determined by a time error signal received by the VCO;

a clock generator connected to the output of the VCO for generating a plurality of clock signals synchronized with said read clock;

a most recent even sample and hold circuit for sampling the signal in the read channel in response to a clock signal received from the clock generator during each odd cycle of operation of the VCO, whereby, throughout each even cycle of operation of the VCO, the most recent even sample and hold circuit stores a most recent even sample of said signal taken during the preceding odd cycle of operation of the VCO;

a previous even sample and hold circuit connected to the output of the most recent even sample and hold circuit for entering the sample in the most recent even sample and hold circuit in response to a clock signal received from the clock generator during each even cycle of operation of the VCO, whereby, throughout each odd cycle of operation of the VCO, the previous even sample and hold circuit stores a previous even sample of said signal taken during the previous odd cycle of operation of the VCO;

a most recent odd sample and hold circuit for sampling the signal in the read channel in response to a clock signal received from the clock generator during each even cycle of operation of the VCO, whereby, throughout each odd cycle of operation of the VCO, the most recent odd sample and hold circuit stores a most recent odd sample of said signal taken during the preceding even cycle of operation of the VCO;

a previous odd sample and hold circuit connected to the output of the most recent odd sample and hold circuit for entering the sample in the most recent odd sample and hold circuit in response to a clock signal received from the clock generator during each odd cycle of operation of the VCO, whereby, throughout each even cycle of operation of the VCO, the previous odd sample and hold circuit stores a previous odd sample of said signal taken during the previous even cycle of operation of the VCO;

even comparator means, connected to the most recent even sample and hold circuit and the reference generator means, for generating an even estimate indicative of the value of the sample stored in the most recent even sample and hold circuit in relation to nominal sample values determined from said nominal signal during each odd cycle of operation of the VCO;

odd comparator means, connected to the most recent odd sample and hold circuit and the reference generator means, for generating an odd estimate indicative of the value of the sample stored in the most recent odd sample and hold circuit in relation to nominal sample values determined from said nominal signal during each even cycle of operation of the VCO;

a two stage even shift register connected to the even comparator means in a read mode of operation of the timing circuit, the even shift register responsive to clock signals received from the clock generator for shifting the even estimate generated by the even comparator means into the first stage of the even shift register no later than the beginning of each even cycle of operation of the VCO and shifting the contents of the first stage of the even shift register into the second stage no later than the beginning of each odd cycle of operation of the VCO, whereby the first stage of the even shift register will contain a most recent even estimate corresponding to the most recent even sample during each even cycle of operation of the VCO and the second stage of the even shift register will contain a previous even estimate corresponding to the previous even sample during each odd phase of operation of the VCO;

a two stage odd shift register connected to the odd comparator means in a read mode of operation of the timing circuit, the odd shift register responsive to clock signals received from the clock generator for shifting the odd estimate generated by the odd comparator means into the first stage of the odd shift register no later than the beginning of each odd cycle of operation of the VCO and shifting the contents of the first stage of the odd shift register into the second stage no later than the beginning of each even cycle of operation of the VCP, whereby the first stage of the odd shift register will contain a most recent odd estimate corresponding to the most recent odd sample during each odd cycle of operation of the VCO and the second stage of the odd shift register will contain a previous odd estimate corresponding to the previous odd sample during each even phase of operation of the VCO;

even time error generator means connected to the most recent even sample and hold circuit and the previous odd sample and hold circuit for generating an even time error signal from the most recent even sample and the previous odd sample in response to a most recent even estimate and a previous odd estimate;

even phase selection means for transmitting the most recent even estimate and the previous odd estimate to the even time error generator means during each even cycle of operation of the VCO;

odd time error generator means connected to the most recent odd sample and hold circuit and the previous even sample and hold circuit for generating an odd time error signal from the most recent odd sample and the previous even sample in response to a most recent odd estimate and a previous even estimate;

odd phase selection means for transmitting the most recent odd estimate and the previous even estimate to the odd time error generator means during each odd cycle of operation of the VCO; and means connected between the even and odd time error generator means and and the input to the VCO for transmitting the even time error to the VCO during each even cycle of operation of the VCO and for transmitting the odd time error to the VCO during each odd cycle of operation of the VCO;

a variable gain amplifier connected within the read channel for adjusting the amplitude of the signal in the read channel in relation to a gain error signal received by the variable gain amplifier;

even gain error generator means connected to the reference generator, the most recent even sample and hold circuit, the previous odd sample hold circuit and the means for transmitting the most recent even estimate and the previous odd estimate to the even time error generator means for generating an even gain error signal from the most recent even sample, the previous odd sample and selected reference voltages in response to a most recent even estimate and a previous odd estimate;

odd gain error generator means connected to the reference generator, the most recent odd sample and hold circuit, the previous even sample and hold circuit and the means for transmitting the most recent odd estimate and the previous even estimate to the odd time error generator means for generating an odd gain error signal from the most recent odd sample, the previous even sample and selected reference voltages in response to a most recent odd estimate and a previous even estimate; and means connected between the even gain error generator means, the odd gain error generator means and the variable gain amplifier for transmitting the sum of the even and odd gain errors to the variable gain amplifier.

2. The timing and gain control circuit of claim 1 wherein the timing circuit further comprises:

means for generating said estimates from clock signals received from the clock generator in an acquisition mode operation of the timing circuit; and means for alternatively placing the timing circuit in a selected one of the read or acquisition modes of operation.

3. The timing and gain control circuit of claim 1 wherein the even time error generator means comprises:

a unity gain, inverting, most recent even sample amplifier connected to the most recent even sample amplifier connected to the most recent even sample and hold circuit for generating a signal of opposite polarity and equal amplitude to the polarity and amplitude of the most recent even sample;

a three way most recent even selector switch having one input terminal connected to the output of the most recent even sample and hold circuit, one input terminal connected to the output of the most recent even sample amplifier, one grounded input terminal, and control terminals connected to the means for transmitting the most recent even estimate and previous odd estimate so as to receive the most recent even estimate during each even cycle of operation of the VCO to transmit a selected one of the most recent even sample, said signal of opposite polarity and equal amplitude to the most recent even sample and a signal having zero amplitude;

a unity gain, inverting, previous odd sample amplifier connected to the previous odd sample and hold circuit for generating a signal of opposite polarity and equal amplitude to the polarity and amplitude of the previous odd sample;

a three way previous odd selector switch having one input terminal connected to the output of the previous odd sample and hold circuit, one input terminal connected to the output of the previous odd sample amplifier, one grounded input terminal, and control terminals connected to the means for transmitting the most recent even estimate and previous odd estimate so as to receive the previous odd estimate during each even cycle of operation of the VCO to transmit a selected one of the previous odd sample, said signal of opposite polarity and equal amplitude to the previous odd sample and a signal having zero amplitude; and an even adder connected to the outputs of the most recent even and previous odd selector switches; and wherein the odd time error generator means comprises:

a unity gain, inverting, most recent odd sample amplifier connected to the most recent odd sample and hold circuit for generating a signal of opposite polarity and equal amplitude to the polarity and amplitude of the most recent odd sample;

a three way most recent odd selector switch having one input terminal connected to the output of the most recent odd sample and hold circuit, one input terminal connected to the output of the most recent odd sample amplifier, one grounded input terminal, and control terminals connected to the means for transmitting the most recent odd estimate and previous even estimate so as to receive the most recent odd estimate during each odd cycle of operation of the VCO to transmit a selected one of the most recent odd sample, said signal of opposite polarity and equal amplitude to the most recent odd sample and a signal having zero amplitude;

a unity gain, inverting, previous even sample amplifier connected to the previous even sample and hold circuit for generating a signal of opposite polarity and equal amplitude to the polarity and amplitude of the previous even sample;

a three way previous even selector switch having one input terminal connected to the output of the previous even sample and hold circuit, one input terminal connected to the output of the previous even sample amplifier, one grounded input terminal, and control terminals connected to the means for transmitting the most recent odd estimate and previous even estimate so as to receive the previous even estimate during each odd cycle of operation of the VCO to transmit a selected one of the previous even sample, said signal of opposite polarity and equal amplitude to the previous even sample and a signal having zero amplitude; and an odd adder connected to the outputs of the most recent odd and previous even selector switches; and wherein the means for transmitting the even time error to the VCO during each even cycle of operation of the VCO and transmitting the odd time error to the VCO during each odd cycle of operation of the VCO is further characterized as an adder connected between the even and odd adders and the input to the VCO.

4. A method for generating clock signals for timing the sampling of signals induced in a PRML read channel for a disc drive, comprising the steps of:

sampling the signal in the read channel during each period of a read clock generated by a VCO;

comparing the samples with selected reference voltages to generate nominal signal estimates for each period of the read clock;

generating an even time error signal during each even cycle of operation of the VCO from the sample of the read channel signal taken during the most recent odd cycle of operation of the VCO, the sample taken in the previous even cycle of operation of the VCO, the nominal signal estimate generated during the most recent odd cycle of operation of the VCO, and the nominal signal estimate generated during the previous even cycle of operation of the VCO;

generating an odd time error signal during each odd cycle of operation of the VCO from the sample of the read channel signal taken during the most recent even cycle of operation of the VCO, the sample taken in the previous odd cycle of operation of the VCO, the nominal signal estimate generated during the most recent even cycle of operation of the VCO, and the nominal signal estimate generated during the previous odd cycle of operation of the VCO;

transmitting the even time error signal to the input of the VCO during each even cycle of operation of the VCO;

transmitting the odd time error signal to the input of the VCO during each odd cycle of operation of the VCO; and generating the clock signals from the read clock generated by the VCO.

\* \* \* \* \*

UNITED STATES PATENT AND TRADEMARK OFFICE
CERTIFICATE OF CORRECTION

PATENT NO. : 5,459,757
DATED : October 17, 1995
INVENTOR(S) : Vadim B. Minuhin, Vladimir Kovner, Steven V. Holsinger and Srinivasan Surendran It is certified that error appears in the above-indentified patent and that said Letters Patent is hereby corrected as shown below:

Column 11, line 24, delete "potions" and substitute therefor --portions--; and

Column 26, line 9, delete "VCP" and substitute therefor --VCO--.

Signed and Sealed this

Sixteenth Day of April, 1996

Attest:

BRUCE LEHMAN

Attesting Officer

Commissioner of Patents and Trademarks